United States Patent
Ge et al.

(10) Patent No.: US 11,252,004 B2
(45) Date of Patent: Feb. 15, 2022

(54) MULTIPLE ACCESS WIRELESS COMMUNICATIONS USING A NON-GAUSSIAN MANIFOLD

(71) Applicants: Yiqun Ge, Kanata (CA); Wuxian Shi, Kanata (CA); Wen Tong, Ottawa (CA)

(72) Inventors: Yiqun Ge, Kanata (CA); Wuxian Shi, Kanata (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 16/834,494

(22) Filed: Mar. 30, 2020

(65) Prior Publication Data

US 2021/0306192 A1 Sep. 30, 2021

(51) Int. Cl.
| | |
|---|---|
| H04L 27/26 | (2006.01) |
| H04W 72/04 | (2009.01) |
| H04J 13/00 | (2011.01) |
| G06N 3/08 | (2006.01) |
| H04L 5/00 | (2006.01) |
| G06N 3/04 | (2006.01) |

(52) U.S. Cl.
CPC ........... *H04L 27/2615* (2013.01); *G06N 3/08* (2013.01); *H04J 13/0007* (2013.01); *H04L 5/0007* (2013.01); *H04W 72/044* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 9,103,910 | B2* | 8/2015 | Holder | G01S 13/04 |
| 2008/0109041 | A1 | 5/2008 | De Voir | |
| 2009/0097772 | A1* | 4/2009 | Zhao | G06K 9/6248 |
| | | | | 382/263 |
| 2014/0128002 | A1* | 5/2014 | Holder | G01S 7/0234 |
| | | | | 455/63.1 |
| 2015/0109165 | A1* | 4/2015 | Holder | G01S 7/0234 |
| | | | | 342/159 |

(Continued)

FOREIGN PATENT DOCUMENTS

| | | |
|---|---|---|
| CN | 102611713 A | 7/2012 |
| CN | 103281166 A | 9/2013 |

(Continued)

OTHER PUBLICATIONS

Samsung, "On the design and performance evaluation of differential codebooks", 3GPP TSG RAN WG1 Meeting #60bis, R1-102205, Beijing, China, Mar. 12-Mar. 16, 2010, 13 pages.

*Primary Examiner* — Kodzovi Acolatse

(57) ABSTRACT

A method and apparatus for multiple-access wireless transmission is disclosed. The method involves mapping a plurality of signals onto a multi-dimensional non-Gaussian source manifold, the plurality of signals including signals targeted for transmission to a plurality of receivers. The method also involves transforming the source manifold into a multi-dimensional target manifold using a polarization stream network. The method further involves generating a multiple-access transmission waveform for transmission to the plurality of receivers, the multiple-access transmission waveform being based on the target manifold.

21 Claims, 11 Drawing Sheets

(56) References Cited

U.S. PATENT DOCUMENTS

| | | | |
|---|---|---|---|
| 2016/0033623 A1* | 2/2016 | Holder | G01S 13/06 |
| | | | 342/93 |
| 2016/0110176 A1 | 4/2016 | Fink et al. | |
| 2016/0366006 A1* | 12/2016 | Hong | H04L 5/0057 |
| 2017/0019193 A1 | 1/2017 | Pratt et al. | |
| 2017/0054583 A1 | 2/2017 | Pratt et al. | |
| 2018/0018554 A1* | 1/2018 | Young | G06N 3/02 |
| 2020/0364187 A1* | 11/2020 | Tran | G06Q 20/02 |

FOREIGN PATENT DOCUMENTS

| | | |
|---|---|---|
| CN | 103685133 A | 3/2014 |
| CN | 103746708 A | 4/2014 |
| CN | 107909115 A | 4/2018 |

\* cited by examiner

MULTIPLE ACCESS WIRELESS COMMUNICATIONS USING A NON-GAUSSIAN MANIFOLD

BACKGROUND

1. Field

This disclosure relates generally to wireless communications, and more specifically to multiple access wireless communications using a non-Gaussian manifold.

2. Description of Related Art

In wireless communications networks, multiple access techniques allow several independent data streams or signals to share the same transmission spectrum simultaneously to increase system efficiency. For example, a base station transmitter may combine and modulate signals intended for different receiving devices into a single downlink waveform. The same waveform is thus received by all of the receiving devices, each of which demodulates the received waveform and extracts its own signals from the waveform.

Linear modulation techniques are commonly used to modulate Gaussian signals for transmission. However, when using linear modulation techniques for modulating multiple access transmissions, it becomes difficult to implement different transmission parameters for different receiving devices. The use of linear modulation of Gaussian signals may result in inefficient use of spectral capacity in cases where the receiving devices experience differing channel conditions. Linear modulators also have difficulty in limiting a peak-to-average-ratio (PAPR) of the transmitted waveform, which results in equipment such as power amplifiers having to accommodate a higher maximum power. Attempts to limit the PAPR usually involve a tradeoff, such as a reduction of spectral efficiency associated with the transmission.

There is a desire in the art for improved modulation techniques.

SUMMARY

In accordance with one disclosed aspect there is provided a method for multiple-access wireless transmission. The method involves mapping a plurality of signals onto a multi-dimensional non-Gaussian source manifold, the plurality of signals including signals targeted for transmission to a plurality of receivers. The method also involves transforming the source manifold into a multi-dimensional target manifold using a polarization stream network. The method further involves generating a multiple-access transmission waveform for transmission to the plurality of receivers, the multiple-access transmission waveform being based on the target manifold.

The target manifold may include a multi-dimensional Gaussian manifold.

The method may involve transmitting configuration information defining the polarization stream network to the plurality of receivers.

The method may involve selecting the source manifold from a plurality of source manifolds in response to a channel condition determined for the transmission.

Some regions of the source manifold may be associated with increased signal attenuation and mapping the plurality of signals may involve mapping the plurality of signals onto regions of the source manifold not associated with increased signal attenuation.

The source manifold may include an N-dimensional manifold and transforming the signals may involve transforming the signals into an M-dimensional target manifold.

The dimension N associated with the source manifold may be equal to the dimension M associated with the target manifold.

The multiple-access transmission waveform may include an orthogonal frequency-division multiple access (OFDMA) transmission waveform including M sub-carriers.

The polarization stream network may be configured for transforming between an N-dimensional source manifold and M-dimensional target manifold, and the dimension N of the source manifold may exceed the dimension M of the target manifold, and excess dimensions of the target manifold may be held constant when transforming signals from the source manifold to the target manifold.

The method may further involve transmitting information to the plurality of receivers identifying the excess dimensions on the target manifold that are held constant.

The multiple-access transmission waveform may include a sparse code multiple access (SCMA) transmission waveform.

The polarization stream network may be configured for transforming between an N-dimensional source manifold and M-dimensional target manifold and the dimension M associated with the target manifold may exceed the dimension N associated with the source manifold by at least one excess dimension.

The method may involve transmitting information to the plurality of receivers identifying the at least one excess dimension.

The multiple-access transmission waveform may include a code-division multiple access (CDMA) transmission waveform and the at least one excess dimension may include a spreading code.

The polarization stream network may include at least one neural network and the method may further involve training the neural network to determine a set of weights for the at least one neural network that are operable to configure the polarization stream network to perform the transformation between the source manifold and the target manifold.

Training the at least one neural network may involve training the neural network to transform from the target manifold to the source manifold to determine the set of weights for the at least one neural network, the polarization stream network being reversible to provide parameters for a reversed polarization stream network operable to transform from the source manifold to the target manifold.

Training the at least one neural network may involve causing the transmitter to train the at least one neural network and the method may further involve transmitting information to the plurality of receivers defining a configuration of the polarization stream network and the set of weights for the least one neural network.

Training the neural network may involve causing one of the plurality of receivers to train the neural network and the method may further involve transmitting information to the plurality of receivers defining a configuration of the polarization stream network and the set of weights for the least one neural network.

The polarization stream network may include a cascade of one or more polarization stages, each polarization stage including at least a shuffle function that shuffles signal data in accordance with a shuffle order, and the method may further involve transmitting information identifying the shuffle order to the plurality of receivers.

The method may involve receiving the multiple-access transmission waveform at one of the plurality of receivers and using the polarization stream network to transform the multiple-access transmission waveform from the target manifold to the source manifold to facilitate recovery of signals targeted for transmission to the one of the plurality of receivers.

In accordance with another disclosed aspect there is provided an apparatus for multiple-access wireless transmission. The apparatus includes a transmitter operably configured to map a plurality of signals onto a multi-dimensional non-Gaussian source manifold, the plurality of signals including signals targeted for transmission to a plurality of receivers. The transmitter is also operably configured to transform the source manifold into a multi-dimensional target manifold using a polarization stream network, and to generate a multiple-access transmission waveform for transmission to the plurality of receivers, the multiple-access transmission waveform being based on the target manifold.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1A:
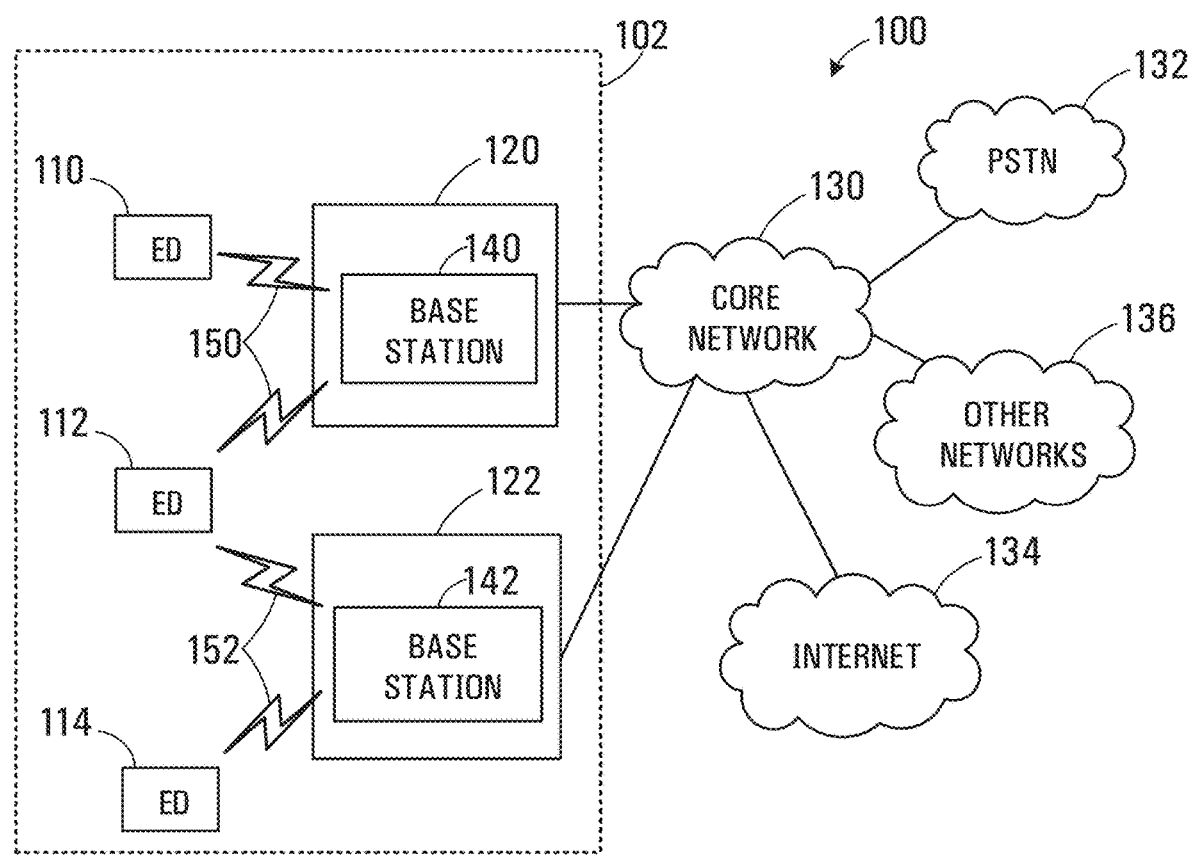
FIG. 1A is a block diagram of an example communication system in accordance with one disclosed embodiment.

FIG. 1A illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes a wireless communications network 102 including electronic devices (ED) 110-114 and radio access networks (RANs) 120, 122. The system 100 also includes a core network 130, a public switched telephone network (PSTN) 132, the Internet 134, and other networks 136. Although certain numbers of these components or elements are shown in FIG. 1, any reasonable number of these components or elements may be included in the system 100.

The EDs 110-114 are configured to operate, communicate, or both, in the system 100. For example, the EDs 110-114 are configured to transmit, receive, or both via wireless communication channels. Each ED 110-114 represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1A, the RANs 120 and 122 include base stations 140 and 142, respectively. Each base station 140, 142 is configured to wirelessly interface with one or more of the EDs 110-114 to enable access to any other base station, the core network 130, the PSTN 132, the Internet 134, and/or the other networks 136. For example, the base stations 140-142 may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router.

Any ED 110-114 may be alternatively or jointly configured to interface, access, or communicate with any other base station 140-142, the internet 134, the core network 130, the PSTN 132, the other networks 136, or any combination of the preceding. Optionally, the system may include RANs, such as RAN 120, wherein the corresponding base station 140 accesses the core network 130 via the internet 134.

The EDs 110-114 and base stations 140-142 are examples of communication equipment that can be configured to implement some, or all of the functionality and/or embodiments described herein. In the embodiment shown in FIG. 1A, the base station 140 forms part of the RAN 120, which may include other base stations, base station controller(s) (BSC), radio network controller(s) (RNC), relay nodes, elements, and/or devices. Any base station 140 or 142 may be a single element, as shown, or multiple elements, distributed in the corresponding RAN, or otherwise. Also, the base station 140 forms part of the RAN 120, which may include other base stations, elements, and/or devices. Each base station 140-142 may be configured to operate to transmit and/or receive wireless signals within a particular geographic region or area, sometimes referred to as a coverage area. A cell may be further divided into cell sectors, and a base station 140-142 may, for example, employ multiple transceivers to provide service to multiple sectors. In some embodiments a base station 140-142 may be implemented as pico or femto nodes where the radio access technology supports such. In some embodiments, multiple-input multiple-output (MIMO) technology may be employed having multiple transceivers for each coverage area. The number of RAN 120, 122 shown in FIG. 1A is exemplary only. Any number of RAN may be contemplated when devising the system 100.

The base stations 140-142 communicate with one or more of the EDs 110-114 over one or more air interfaces 150 and 152 using wireless communication links e.g. RF, µWave, IR, etc. The air interfaces 150 and 152 may utilize any suitable radio access technology. For example, the system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 150 and 152.

A base station 140-142 may implement Universal Mobile Telecommunication System (UMTS) Terrestrial Radio Access (UTRA) to establish an air interface 150 using wideband CDMA (WCDMA). In doing so, the base station 140-142 may implement protocols such as HSPA, HSPA+ optionally including HSDPA, HSUPA or both. Alternatively, a base station 140-142 may establish an air interface 150 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA1800, CDMA1800 1X, CDMA1800 EV-DO, IS-1800, IS-95, IS-856, GSM, EDGE, and GERAN. Of course, other multiple access schemes and wireless protocols may be utilized.

The RANs 120 and 122 are in communication with the core network 130 to provide the EDs 110-114 with various services such as voice, data, and other services. Understandably, the RANs 120 and 122 and/or the core network 130 may be in direct or indirect communication with one or more other RANs (not shown), which may or may not be directly served by core network 130, and may or may not employ the same radio access technology as RAN 120, RAN 122 or both. The core network 130 may also serve as a gateway access between (i) the RANs 120 and 122 or EDs 110-114 or both, and (ii) other networks (such as the PSTN 132, the Internet 134, and the other networks 136). In addition, some, or all of the EDs 110-114 may include functionality for communicating with different wireless networks over different wireless links using different wireless technologies and/or protocols. PSTN 132 may include circuit switched telephone networks for providing plain old telephone service (POTS). Internet 134 may include a network of computers and subnets (intranets) or both, and incorporate protocols, such as IP, TCP, UDP. EDs 110-114 may be multimode devices capable of operation according to multiple radio access technologies, and incorporate multiple transceivers necessary to support such.

The RANs 120, 122, base stations 140, 142, and the core network 130 together may be referred to as "network equipment". The network equipment elements may be physically distributed within a coverage area. The core network 130 generally includes computer processor hardware that interfaces between the PSTN 132, Internet 134, and other networks 136 and the RANs 120, 122 to provide services to the EDs 110-114.

Figure 1B:
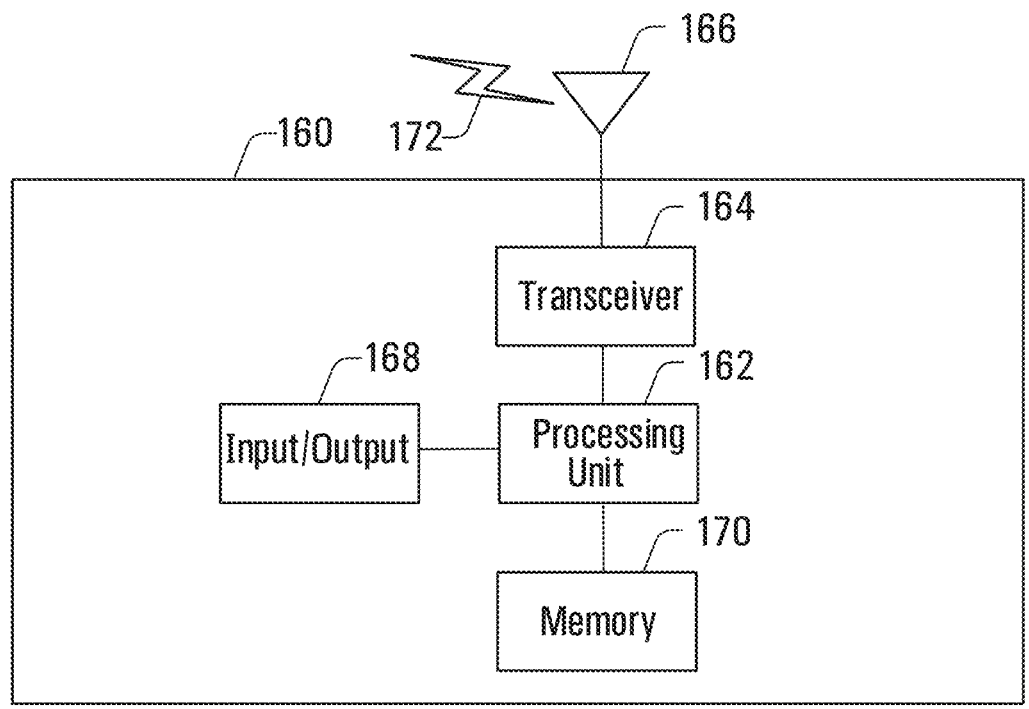
FIG. 1B is a block diagram of an example of an electronic device in accordance with one disclosed embodiment.
Figure 1C:
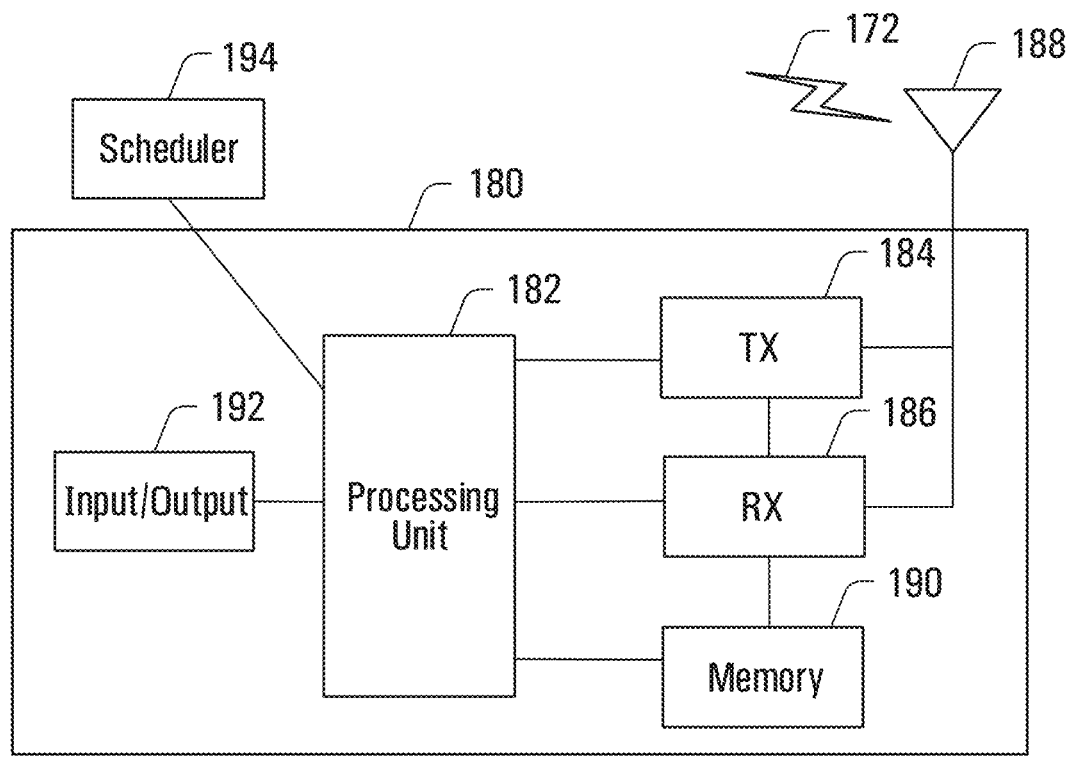
FIG. 1C is a block diagram of an example of a base station in accordance with one disclosed embodiment.

FIGS. 1B and 1C illustrate example devices that may be used in implementing the network 102 shown in FIG. 1A. In particular, FIG. 1B illustrates an example of an ED 160, and FIG. 1C illustrates an example base station 180. These components could be used in the communication system 100 or in any other suitable system.

As shown in FIG. 1B, the ED 160 includes at least one processing unit 162. The processing unit 162 implements various processing operations of the ED 160. For example, the processing unit 162 could perform signal coding, data processing, power control, input/output processing, or any other functionality enabling the ED 160 to operate in the communication system 100. The processing unit 162 may also be configured to implement some or all of the functionality and/or embodiments described in more detail elsewhere herein. Each processing unit 162 includes any suitable processing or computing device configured to perform one or more operations. Each processing unit 162 could, for example, include a microprocessor, microcontroller, digital signal processor, field programmable gate array, or application specific integrated circuit.

The ED 160 also includes at least one transceiver 164. The transceiver 164 is configured to modulate data or other content for transmission by at least one antenna or Network Interface Controller (NIC) 166. The transceiver 164 is also configured to demodulate data or other content received by the at least one antenna 166. Each transceiver 164 includes any suitable structure for generating signals for wireless or wired transmission and/or processing signals received wirelessly or by wire at the antenna 166. Each antenna 166 includes any suitable structure for transmitting and/or receiving wireless or wired signals 172. One or multiple transceivers 164 could be used in the ED 160. One or multiple antennas 166 could be used in the ED 160. Although shown as a single functional unit, a transceiver 164 could also be implemented using at least one transmitter and at least one separate receiver.

The ED 160 further includes one or more input/output devices 168 or interfaces (such as a wired interface to the internet 134 in FIG. 1A). The input/output devices 168 permit interaction with a user or other devices in the network. Each input/output device 168 includes any suitable structure for providing information to or receiving information from a user, such as a speaker, microphone, keypad, keyboard, display, or touch screen, including network interface communications.

In addition, the ED 160 includes at least one memory 170. The memory 170 stores instructions and data used, generated, or collected by the ED 160. For example, the memory 170 could store software instructions or modules configured to implement some or all of the functionality and/or embodiments described herein and that are executed by the processing unit(s) 162. Each memory 170 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 1C, the base station 180 includes at least one processing unit 182, at least one transmitter 184, at least one receiver 186, one or more antennas 188, at least one memory 190, and one or more input/output devices or interfaces 192. A transceiver, not shown, may be used instead of the transmitter 184 and receiver 186. A scheduler 194 may be coupled to the processing unit 182. The scheduler 194 may be included within or operated separately from the base station 180. The processing unit 182 implements various processing operations of the base station 180, such as signal coding, data processing, power control, input/output processing, or any other functionality. The processing unit 182 can also be configured to implement some or all of the functionality and/or embodiments described in more detail herein. Each processing unit 182 includes any suitable processing or computing device configured to perform one or more operations. Each processing unit 182 could, for example, include a microprocessor, microcontroller, digital signal processor, field programmable gate array, or application specific integrated circuit.

Each transmitter 184 includes any suitable structure for generating signals for wireless or wired transmission to one or more EDs or other devices. Each receiver 186 includes any suitable structure for processing signals received wirelessly or by wire from one or more EDs or other devices. Although shown as separate components, at least one transmitter 184 and at least one receiver 186 could be combined into a transceiver. Each antenna 188 includes any suitable structure for transmitting and/or receiving wireless or wired signals 172. Although a common antenna 188 is shown here as being coupled to both the transmitter 184 and the receiver 186, one or more antennas 188 could be coupled to the transmitter(s) 184, and one or more separate antennas 188 could be coupled to the receiver(s) 186. Each memory 190 includes any suitable volatile and/or non-volatile storage and retrieval device(s) such as those described above in connection to the ED 160 in FIG. 1B. The memory 190 stores instructions and data used, generated, or collected by the base station 180. For example, the memory 190 could store software instructions or modules configured to implement some or all of the functionality and/or embodiments described herein and that are executed by the processing unit(s) 182.

Each input/output device 192 permits interaction with a user or other devices in the network. Each input/output device 192 includes any suitable structure for providing information to or receiving/providing information from a user, including network interface communications.

It should be appreciated that one or more steps of the embodiment methods provided herein may be performed by corresponding units or modules, according to FIGS. 1A-1C. For example, a signal may be transmitted by a transmitting unit or a transmitting module. A signal may be received by a receiving unit or a receiving module. A signal may be processed by a processing unit or a processing module. Other steps may be performed by a machine learning (ML) module in both transmitting and receiving modules. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor unit for example, they may be retrieved by a processor, in whole or part as needed, individually or together for processing, in single or multiple instances, and that the modules themselves may include instructions for further deployment and instantiation. Additional details regarding the EDs such as the ED 160 and the base stations such as 180 are known to those of skill in the art. As such, these details are omitted here.

Figure 2A:
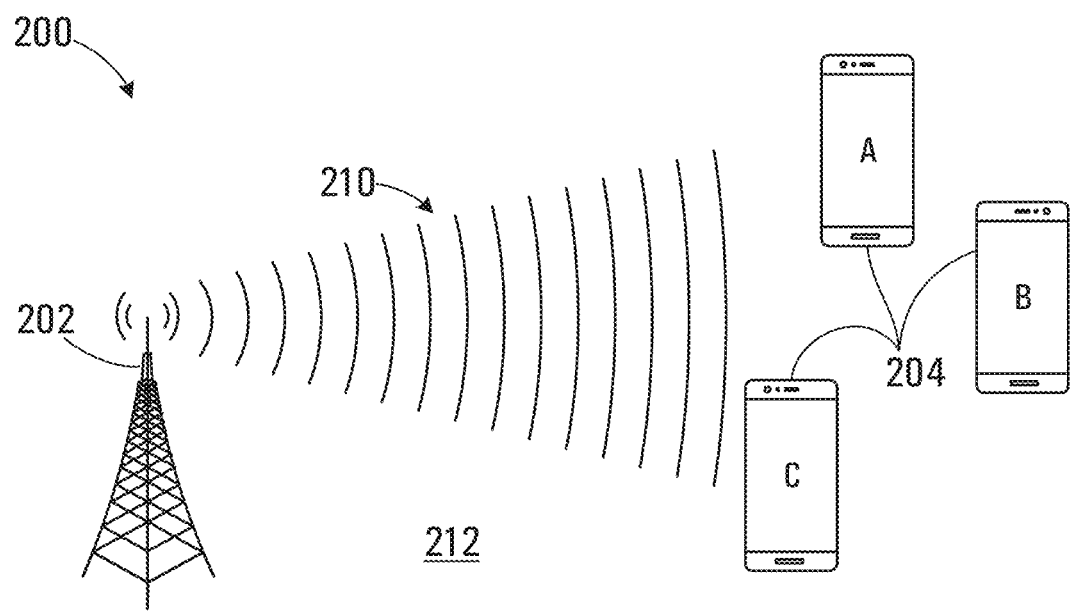
FIG. 2A is a schematic view of a physical layout of a portion of a wireless communications network in accordance with a disclosed embodiment.

A physical layout of a portion of a wireless communications network in which a multiple access wireless transmission is taking place is shown schematically at 200 in FIG. 2A. Referring to FIG. 2A, the wireless communications network 200 includes a base station 202, and a plurality of receivers 204 (respectively identified as A, B, and C in FIG. 2). The base station 202 is configured to transmit a multiple access transmission waveform 210 within a geographic region 212 generally as described above in connection with the base stations 140, 142. Each of the plurality of receivers 204 are capable of receiving the multiple access transmission waveform 210 and processing the waveform to extract signals targeted for transmission to the receiver. The multiple access transmission waveform thus combines signals targeted to each one of the plurality of receivers 204, which are modulated to generate the multiple access transmission waveform. The multiple access transmission waveform 210 facilitates more efficient use of the available spectrum in the region 212 than would be the case if individual waveforms were to be generated and transmitted to each of the plurality of receivers 204.

Figure 2B:
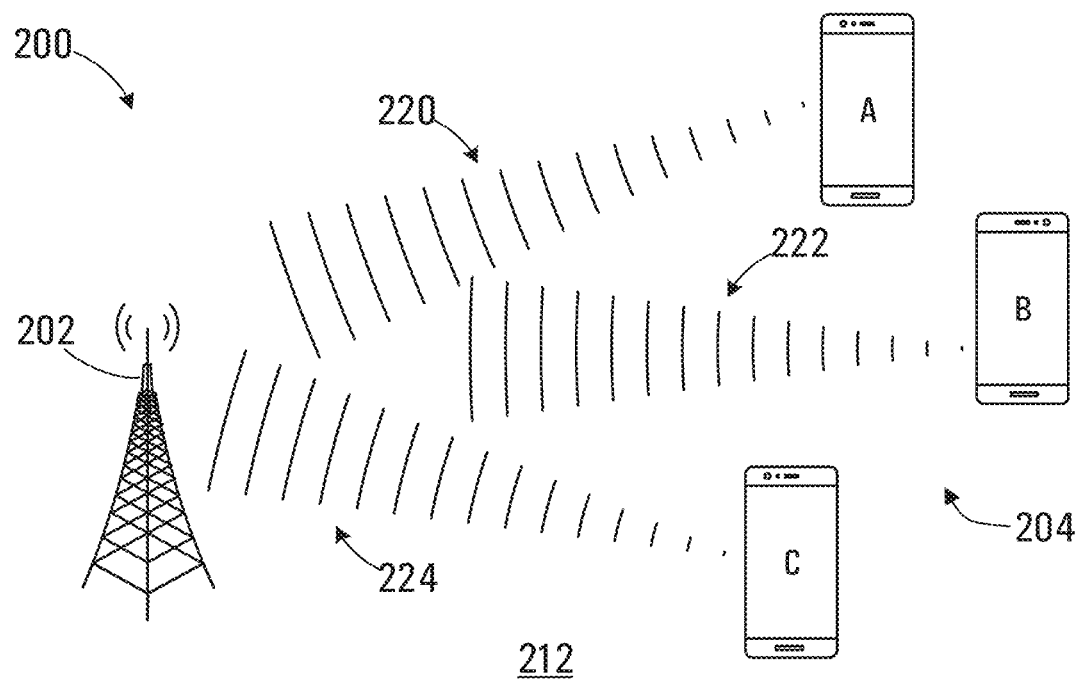
FIG. 2B is a schematic view of a physical layout of a portion of a wireless communications network in accordance with another disclosed embodiment.

In FIG. 2A, the multiple access transmission waveform 210 is transmitted in a downlink communication from the base station 202 to the plurality of receivers 204. Referring to FIG. 2B, in some embodiments, each of the plurality of receivers 204 may be configured to generate and transmit respective waveforms 220, 222, and 224 to the base station 202 in an uplink communication. The waveforms 220, 222, and 224 may be generated such that in combination, the waveforms when received at the base station 202 may be processed to extract signals transmitted by each of the receivers A, B and C. The waveforms 220, 222, and 224 may thus make use of generally the same available spectrum in the region 212 as used for the multiple access transmission waveform 210.

Various multiple access modulation techniques such as orthogonal frequency-division multiple access (OFDMA), sparse code multiple access (SCMA), and code-division multiple access (CDMA), may be used to generate the multiple access transmission waveform 210. Linear multiple access modulators may be inherently less flexible in the amount of shaping that can be performed in the frequency domain. For example, in the case of a linear OFDMA modulator, the same processing is generally applied to each of the signals targeted to each of the receivers A, B, and C in the plurality of receivers 204, to reduce interference between transmitted sub-carriers of the OFDMA waveform. However, transmissions of the waveform 210 to one or more of the plurality of receivers 204 may be more or less impacted by noise. For example, the receiver B in FIG. 2 is shown located further away from the base station 202 within the region 212 and the transmission waveform 210 may be attenuated due to the additional distance or transmission obstacles between the transmitter and the receiver. Linear multiple access modulators are not generally able to perform different processing of signals targeted to one or more of the plurality of receivers 204 to compensate for channel conditions that only affect certain receivers. The linear OFDMA modulator is thus unable to perform separate processing, for example, implementing more robust modulation scheme, for the receiver B.

Figure 3A:
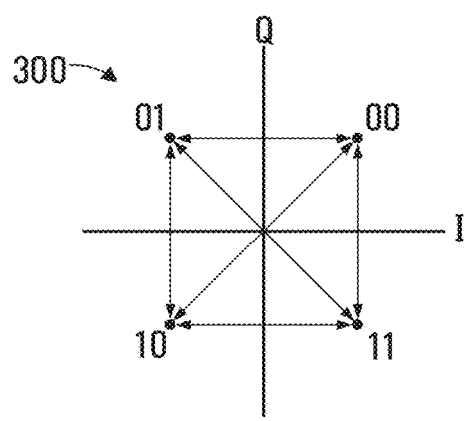
FIG. 3A is a graphical depiction of an example of a constellation on a complex I-O, plane.

The spectral capacity of a communications channel in the wireless communications network 200 is important for efficient multiple access transmissions. The efficiency of use of available spectrum depends on how information intended for receipt by any of the plurality of receivers 204 is modulated onto the transmission waveform 210. An example of a symbol constellation is shown in FIG. 3A at 300, in which four two-bit quadrature phase shift keying (QPSK) symbols are represented at coordinate locations a complex I-Q plane. The separation between each symbol in the constellation may be expressed in terms of a Euclidian distances between the constellation points in the in the I-Q plane (indicated by the arrows in FIG. 3). The closer together the points are the more susceptible or vulnerable the resulting modulated waveform will be to noise and data errors. As the level of noise on the channel between the base station transmitter 202 and the receivers 204 increases, the receiver may be unable to unambiguously determine which position on the constellation a received signal is supposed to occupy, resulting in errors.

Figure 3B:
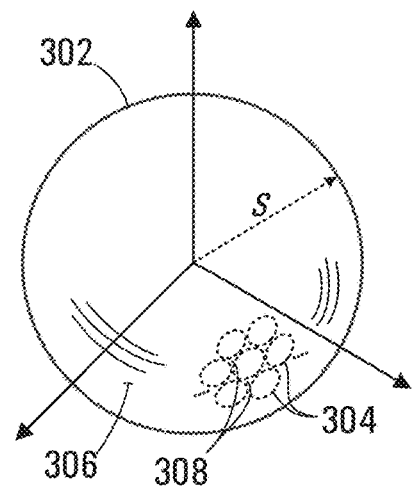
FIG. 3B is an example of a Gaussian manifold for generating a multiple access transmission waveform.

The multiple access transmission waveform 210 may be generated by modulating a waveform based on the constellation 300. Gaussian waveforms may be represented as a manifold or probability distribution. Referring to FIG. 3B, a simplified three-dimensional Gaussian manifold for generating the multiple access transmission waveform 210 may be represented as a three-dimensional sphere 302, having a radius corresponding to the transmitted signal power S. The sphere 302 provides a geometric representation of the spectral capacity of a communications channel for the example of a three-dimensional signal. In practice, typical signals transmitted in the wireless communications network 200 will have more than three dimensions. The capacity of the channel or bandwidth B is determined by the number of non-overlapping circles 304 can be arranged on a surface 306 of the sphere 302. The size of the circles 304 correspond to the Euclidian distance between constellation points in FIG. 3A, and thus a minimum size of the circles will be lower bounded by the noise N on the channel. The capacity of the channel C is given by the Shannon-Hartley theorem:

$$C = B \cdot \log_2(1 + S/N). \quad \text{Eqn 1}$$

From equation 1, it can be seen that the capacity C for a given transmission power S may be increased by increasing B (i.e. the number of overlapping circles 304). By increasing the number of circles 304, more circles can be accommodated on the surface 306. However, as the number of circles on the surface 306 increases, the size of the circles 304 decreases, and eventually the circle size would reach a lower bound of the channel noise N. Alternatively, for a given number of circles 304 (i.e. fixed B), the transmission power S may be reduced until the size of the circles reaches the lower bound of the noise N. In either case, there is an assumption in applying the Shannon-Hartley theorem that the circles 304 should be non-overlapping, which leaves unused area 308 between adjacent circles, because the Shannon capacity limit is based on Euclidean distance. The unused area 308 on the surface 306 of the sphere 302 represents a potentially unused portion of the spectral capacity of the channel.

Figure 4:
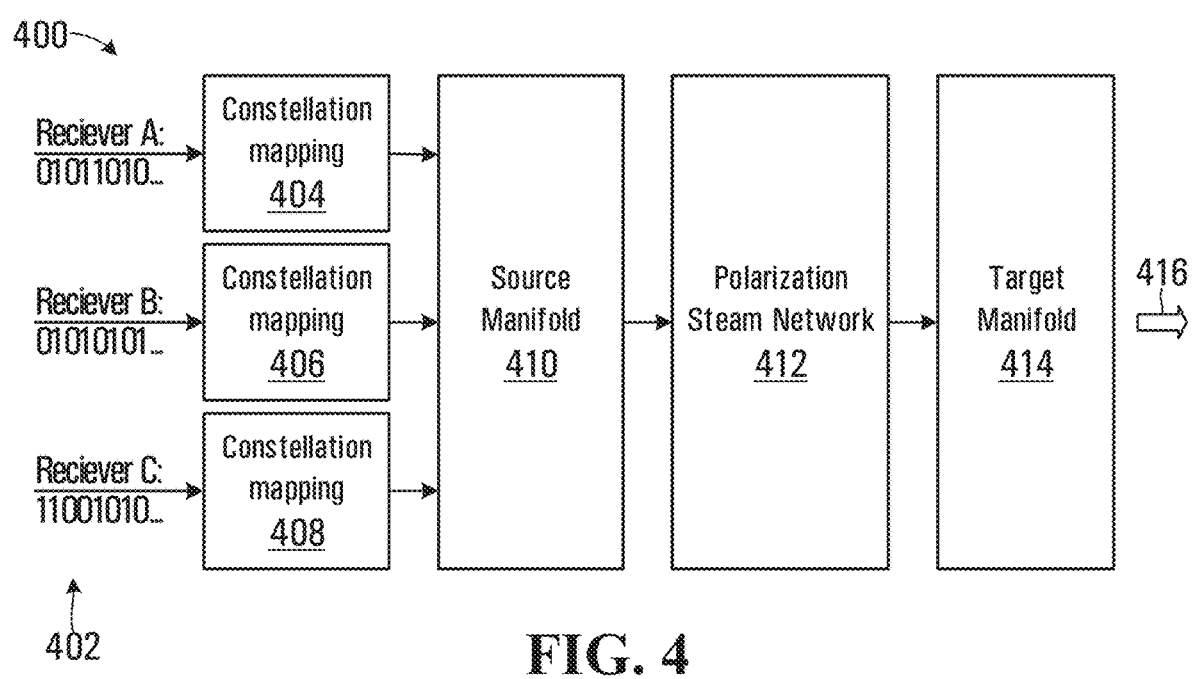
FIG. 4 is a block diagram of a modulator implemented at a base station shown in FIG. 2.

A block diagram of a modulator implemented at the base station 202 is shown generally at 400 in FIG. 4. Referring to FIG. 3, the modulator 400 is configured to receive signals 402 targeted for transmission to each of the plurality of receivers A, B and C in the plurality of receivers 204. The signals 402 for the receivers A, B and C are mapped by respective constellation mapping blocks 404, 406, and 408 onto a source manifold 410, such as a non-Gaussian manifold. The source manifold 410 is transformed by a polarization stream network 412 into a target manifold 414, which may be a Gaussian manifold. The target manifold 414 is used as the basis for generation of the multiple-access transmission waveform 416 by a transmitter of the base station 202. The multiple access transmission waveform 416 is transmitted to the plurality of receivers 204.

In existing wireless communications networks, it may be expected that transmissions over a communication channel between base station 202 and the plurality of receivers 204 involve linear processes. The selection of a Gaussian target manifold 414 facilitates operation of the modulator 400 with existing linear network equipment. However, in other embodiments the target manifold 414 may be a non-Gaussian manifold.

Figure 5A:
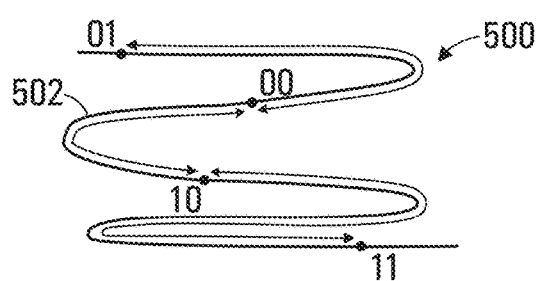
FIG. 5A is a schematic view of a symbol constellation on a non-Gaussian manifold.

An example of a constellation 500 on a simplified and generic representation of a non-Gaussian source manifold 502 is shown in FIG. 5A. As an example, the manifold 502 may be a multi-dimensional non-orthonormal manifold such as a Riemannian manifold, or other non-Gaussian manifold. Four two-bit symbols are represented on the manifold 502. In this case the separation between each symbol in the constellation 500 is based on Geodesic Distance rather than Euclidian distance, as in the case of the constellation 300 shown in FIG. 3. The Geodesic Distances between adjacent constellation points on the manifold 502 are indicated by arrows in FIG. 5A. The separation between constellation points in the constellation 500 is thus greater than the separation provided by the constellation 300 of FIG. 3 and should thus provide improved noise performance. The manifold capacity assumptions, related to a Gaussian manifold such as shown in FIG. 3B, of uniform non-overlapping circles no longer apply, and the capacity of the manifold is not limited by the Shannon-Hartley theorem.

Figure 5B:
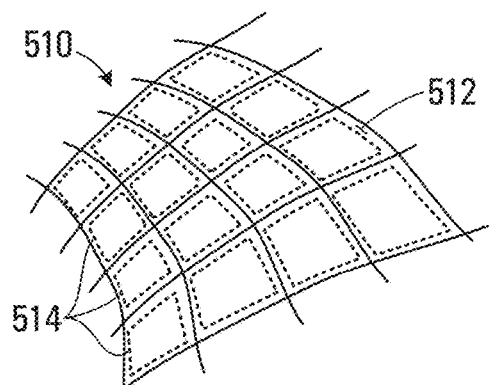
FIG. 5B is a 3D graphical representation of a portion of a non-Gaussian manifold.

A portion of a non-Gaussian manifold 510 is shown in FIG. 5B as a three-dimensional surface 512. Because the Gaussian constraint of non-overlapping circles no longer applies, a greater number of signal constellations can be mapped onto the non-Gaussian manifold 510, thus reducing the amount of unused spectral capacity on the non-Gaussian manifold 510. In FIG. 5B, the signal constellations are represented as areas outlined by broken lines 514. Some regions of the non-Gaussian manifold 510 may be associated with increased signal attenuation. To improve performance, signals constellations may be mapped onto regions of the manifold that are not associated with increased signal attenuation.

Figure 6:
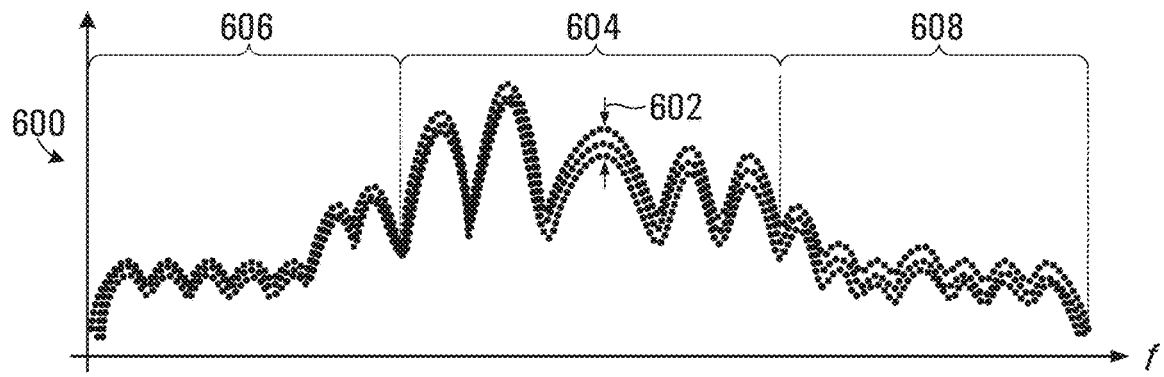
FIG. 6 is a graphical representation of a non-Gaussian manifold example.

An example of a non-Gaussian manifold for implementing the source manifold 410 is shown in FIG. 6 at 600. The source manifold 600 is represented by a cloud of samples or points distributed over the frequency range $f$. The manifold 600 incorporates a tolerable white noise level 602 by generating thicker manifold rather than a simple multi-dimensional surface. The source manifold 600 accommodates different channel conditions for the receivers A, B, and C in the plurality of receivers 204 by including a less frequency selective portion 604 for receiver B and more frequency selective portions 606 and 608 for receivers A and C. The manifold 600 represents just one example that may be selected for use as the source manifold 410. In practice, the selection of a manifold may be made from a plurality of source manifolds in response to channel conditions determined for the transmissions to the plurality of receivers 204.

Figure 7:
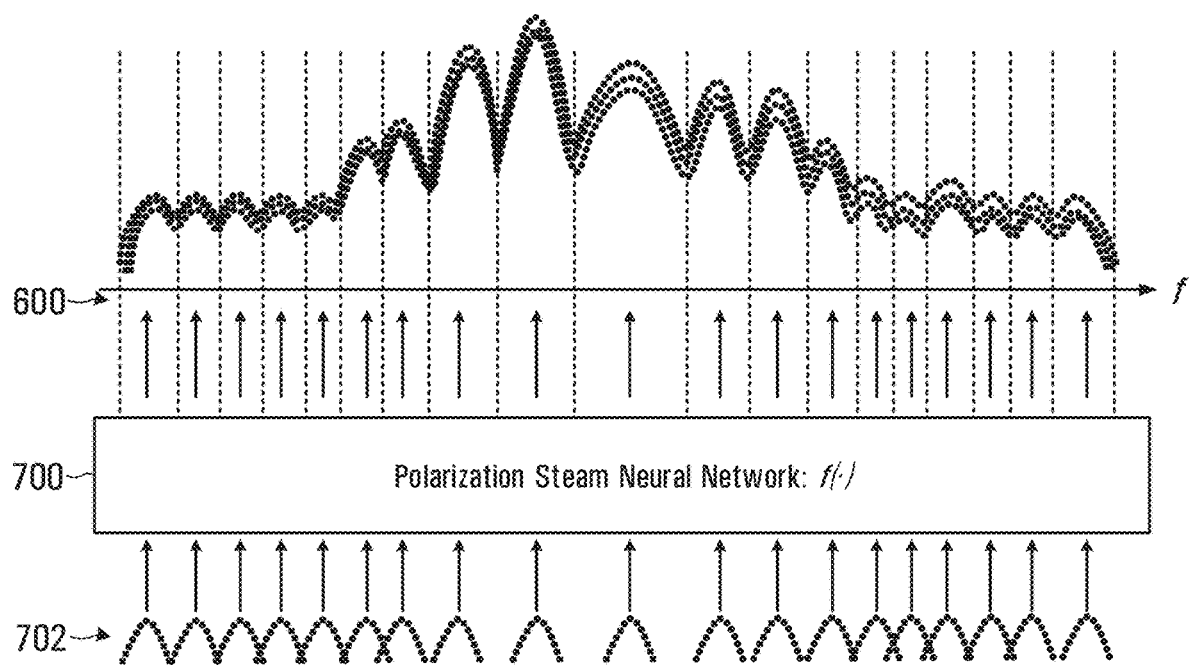
FIG. 7 is a schematic view illustrating a training process for training a polarization stream neural network.

In one embodiment, the polarization stream network 412 may be implemented using a neural network. Referring to FIG. 7, a polarization stream neural network 700 may be trained in a training exercise to transform between the non-Gaussian source manifold 600 and a multi-dimensional Gaussian target manifold 702. The polarization stream neural network 700 includes a cascade of homomorphism transformations for shaping between the non-Gaussian source manifold 600 and the target manifold 702, which are configured in a training exercise. The training exercise is performed to transform from the multi-dimensional Gaussian target manifold 702 to the non-Gaussian source manifold 600, which has been found to be a convenient training strategy. However, in other embodiments the training exercise may be performed for transformation from the non-Gaussian source manifold 600 to the multi-dimensional Gaussian target manifold 702. In this embodiment the source manifold 600 and the target manifold 702 have the same number of signal dimensions, which facilitates inversion to generate a reverse polarization stream network for performing the reverse transformation.

Figure 8:
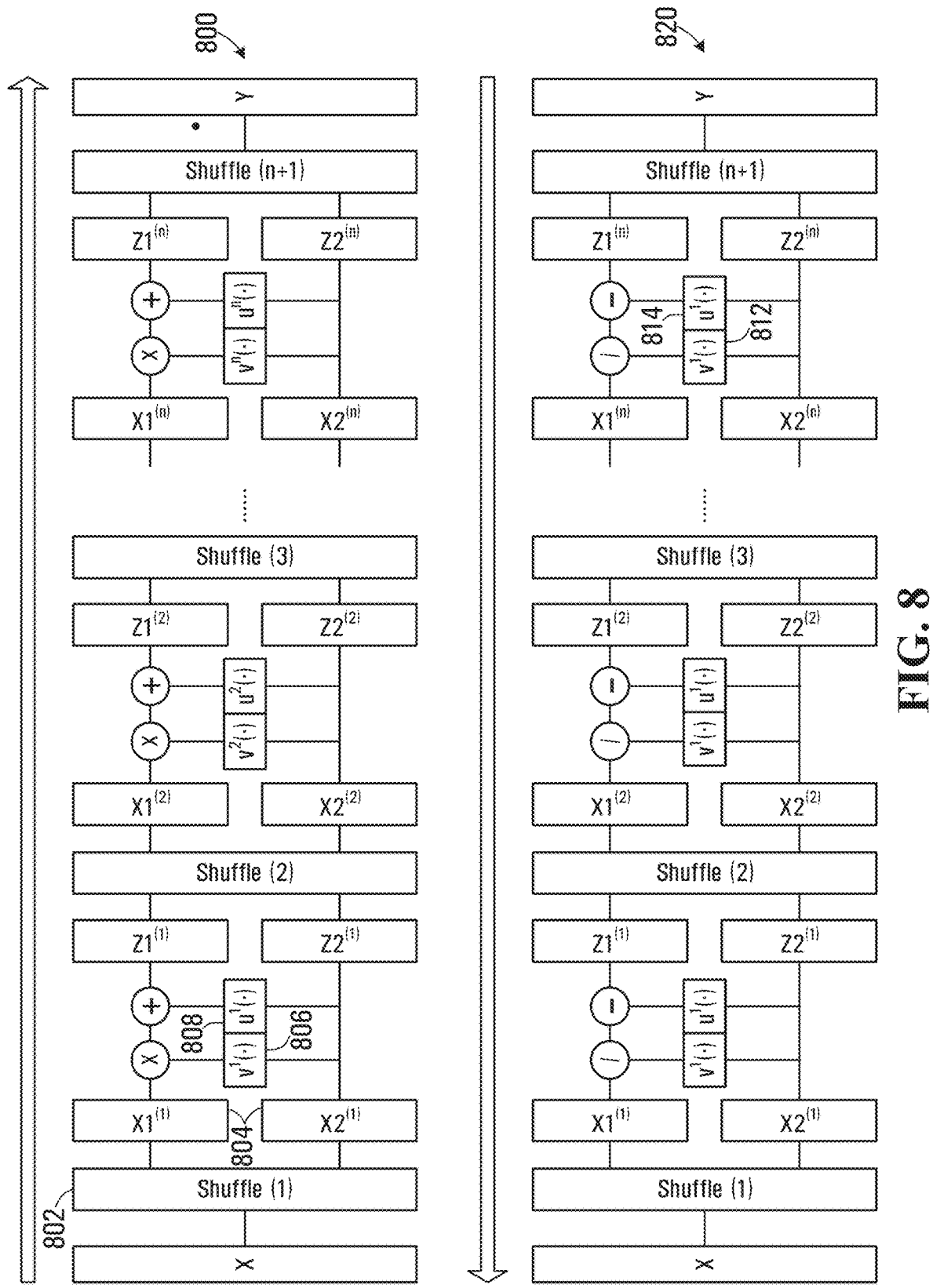
FIG. 8 is a block diagram of a forward polarization stream network and a reverse polarization stream network.

Configurations of a forward polarization stream network 800 and a reverse polarization stream network 820 are shown schematically in generalized form in FIG. 8. The forward and reverse polarization stream networks 800 and 820 each include a cascade of n stages that transform between an input signal X and an output signal Y having the same number of dimensions. The input signal X may include a plurality of bits of information representing a complex value signal. Each stage in the cascade of stages is similarly configured and includes a shuffle block 802, a split block 804, a scaling function 806, and an offset function 808. The shuffle block 802 implements a shuffle or permutation function that receives the set of input bits X and outputs a set of shuffled or permuted bits. The shuffle or permutation may be performed in accordance with a permutation table, for example. The split block 804 implements a split function, which splits the shuffled bits into a first shuffled bit group $X1^{(1)}$ and a second shuffled bit group $X2^{(1)}$. With the inclusion of the scaling function 806 and offset function 808, each stage in the cascade may be written as follows:

$$\vec{Z1}^{(n)} = \vec{X1}^{(n)} \times v(\vec{X2}^{(n)}) + u(\vec{X2}^{(n)})$$

$$\vec{Z2}^{(n)} = \vec{X2}^{(n)}$$

$$\vec{X}^{(n)} = \text{shuffle}_n(\vec{Z}^{(n-1)}), \quad \text{Eqn 2}$$

where the × operator is a dot-wise (or more generally element-wise) multiplication and the + operator represents element-wise addition operation between two operand vectors. Thus, each stage shuffles the input signals, and splits the shuffled information into a first group, $\vec{X1}$ and a second group, $\vec{X2}$. The scaling function v(·) 806 is applied to the second group $\vec{X2}$ to generate a scaling vector (v($\vec{X2}$)), and the offset function u(·) 808 is applied to the second group $\vec{X2}$ to generate an offset vector (u($\vec{X2}$)). Both the scaling vector and the offset vector have dimension size equal to the first group $\vec{X1}$. The output of each stage $\vec{Z1}^n$ is obtained by element-wise multiplying the first information group with the scaling vector, then element-wise adding the offset vector. The output $\vec{Z2}^n$ is a copy of the second information group $\vec{X2}$.

The reverse polarization stream network 820 operates on an input signal Y and produces an output signal X. The × operator is replaced by a dot-wise (or more generally element-wise) division and the + operator is replaced by an element-wise subtraction operation between two operand vectors. The scaling function v(·) 812 and offset function u(·) 814 are unchanged from the forward polarization stream network 800. Thus, each stage in the reverse polarization stream network 820 shuffles the input signal and splits the shuffled information into a first group $\vec{Z1}$ and a second group $\vec{Z2}$. The scaling function v(·) 812 is applied to the second group $\vec{Z2}$ to generate a scaling vector (v($\vec{Z2}$)), and the offset function u(·) 814 is applied to the second group $\vec{Z2}$ to generate an offset vector (u($\vec{Z2}$)). Both the scaling vector and the offset vector have dimension size equal to the first information group. The outputs for each stage are thus given by:

$$\vec{X1}^{(n)} = (\vec{Z1}^{(n)} - u(\vec{Z2}^{(n)}))/v(\vec{Z2}^{(n)})$$

$$\vec{X2}^{(n)} = \vec{Z2}^{(n)}$$

$$\vec{Z1}^{(n)} = \text{Shuffle}_n(\vec{Z1}^{(n+1)}) \quad \text{Eqn 3}$$

The second output $\vec{X2}$ is a copy of the group $\vec{Z2}$. The first output information group is obtained by element-wise subtracting the offset vector from the first information group, then element-wise dividing by the scaling vector.

Due to common elements appearing in both the forward and reverse polarization stream networks 800 and 820, it is only necessary to perform the training for either the forward or the reverse network. For example, if the forward network 800 were to be trained, the reverse network 820 may be easily obtained by exchanging the multiplication and division operators, and the addition and subtraction operators, and reversing the input and output. The addition of the scaling function to the polarization stream networks 800 and 820 depresses the reliability of some points or dimensions and boosts the reliability of other points or dimensions. Together, the scaling function v(·) and the offset function u(·) provide flexibility to polarize the reliabilities over the signal space for shaping of the input X to the output Y.

Figure 9:
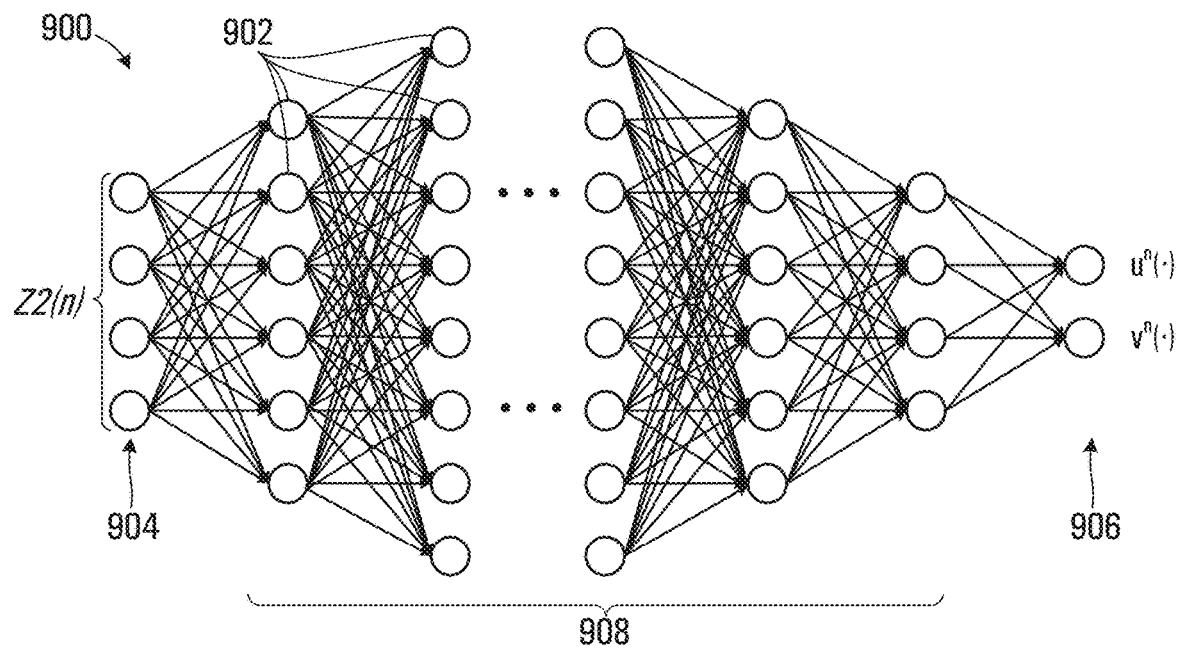
FIG. 9 is a schematic representation of a neural network for implementing a scaling function and an offset function used in the polarization stream networks shown in FIG. 8.

In one embodiment, the scaling and offset functions v(·) and u(·) may be implemented as neural networks within the forward and reverse polarization stream networks 800 and 820. An example of a neural network portion for implementing the scaling and offset functions v(·) and u(·) is shown in FIG. 9 at 900. The neural network 900 includes sets of fully connected nodes 902 in multiple layers including an input layer 904, an output layer 906, and multiple hidden layers 908. The input layer 904 includes nodes that receive the second group vector $\vec{Z2}^n$. The output layer 906 includes output nodes that provide the scaling and offset functions v(·) and u(·) for each stage in the cascade of stages for the forward and reverse polarization stream networks 800 and 820. Each arrow connecting between the nodes may have an associated weighting factor $w_i$, which is determined in the training exercise shown in FIG. 7. The training exercise shown in FIG. 7 results in a set of weights $w_i$ being determined for the network 820 to perform the transformation between an input Y (i.e. the target manifold 702) and the output X (i.e. the source manifold 600).

Additional details and configurations and training of forward and reverse polarization stream neural networks are described in commonly owned patent application U.S. Ser. No. 16/562,045 filed on Sep. 5, 2019 and entitled "A METHOD AND APPARATUS FOR WIRELESS COMMUNICATION USING POLARIZATION-BASED SIGNAL SPACE MAPPING", which is incorporated herein by reference in its entirety.

Figure 10:
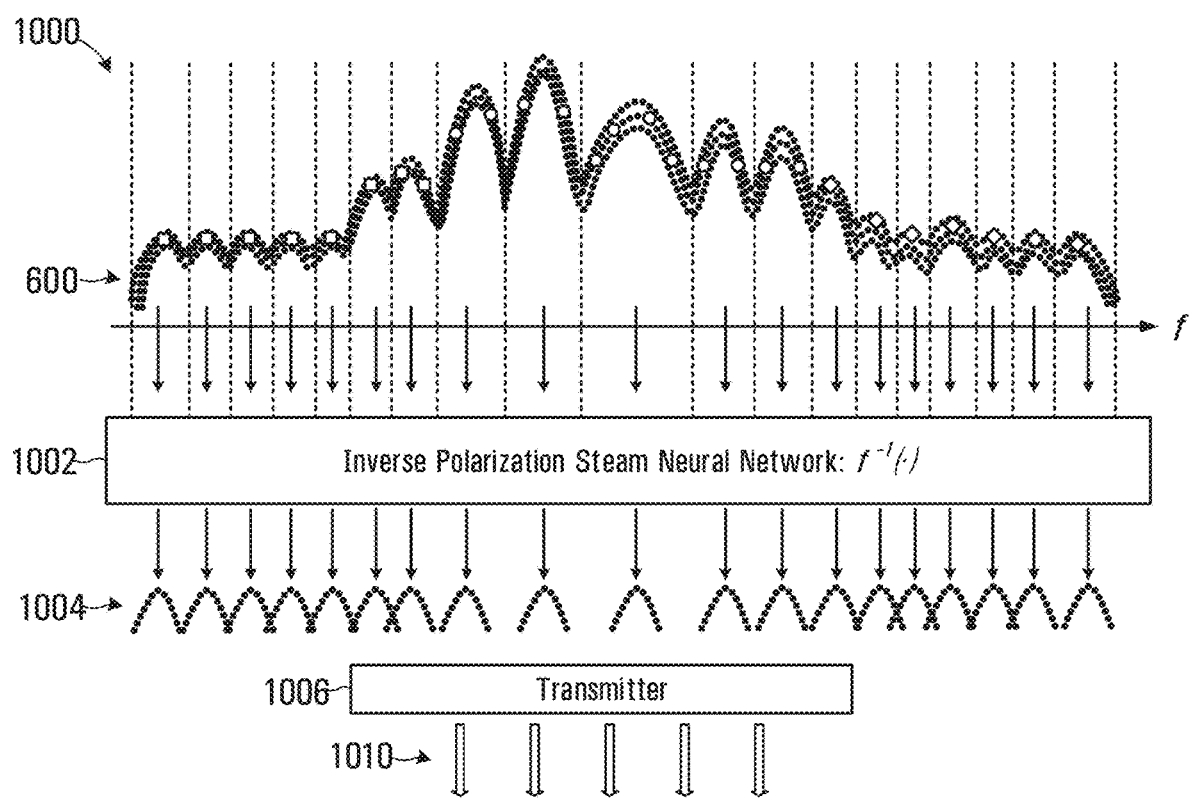
FIG. 10 is a block diagram of a process for modulating and transmitting a multiple-access waveform.

Referring to FIG. 10, a modulation and transmission process implemented by the base station transmitter 202 for transmissions to the plurality of receivers 204 is illustrated schematically at 1000. The base station transmitter 202 performs constellation mapping 404-406 (FIG. 4) to map signals intended for transmission to each receiver A, B or C as symbols on the source manifold 600. Each symbol represents one or more bits of information for transmission, and in FIG. 10 these symbols are indicated by squares "□", circles "○", or diamonds "◇". The symbols indicated as squares "□" are intended for transmission to receiver A and are mapped onto a first portion of the source manifold 600. The symbols indicated as circles "○" are intended for transmission to receiver B and are mapped onto a second portion of the source manifold 600. The symbols indicated as diamonds "◇" are intended for transmission to receiver C and are mapped onto a third portion of the source manifold 600. As shown in FIG. 10, it is not necessary for each dimension of the source manifold 600 to carry the same number of constellation symbols. Some of the dimensions of the source manifold 600 may accommodate more constellation symbols than other dimensions. For example, a central portion of the manifold accommodates four "○" symbols, whereas adjacent portions may only accommodate two "○" symbols. Other dimensions of the source manifold 600 may accommodate only a single symbol.

The base station 202 configures a reverse polarization stream neural network $f^{-1}(\cdot)$ 1002 using weights $w_i$, determined during the training exercise. The network 1002 thus transforms the symbols mapped onto the source manifold 600 into a source manifold 1004. In this embodiment the source manifold 1004 has a multi-dimensional Gaussian distribution, which represents the transmitted symbols from each of the plurality of receivers 204. The source manifold 600 is an N-dimensional manifold and the target manifold 1004 is an M-dimensional manifold including M sub-carriers. The number of dimensions of the source manifold 600 thus corresponds with the number of dimensions in the source manifold 1004 such that M=N.

A transmitter 1006 then generates a multiple-access transmission waveform 1010 based on the multi-dimensional Gaussian distribution of the source manifold 1004. The waveform 1010 is then transmitted by the base station 202 to each of the plurality of receivers 204.

Figure 11:
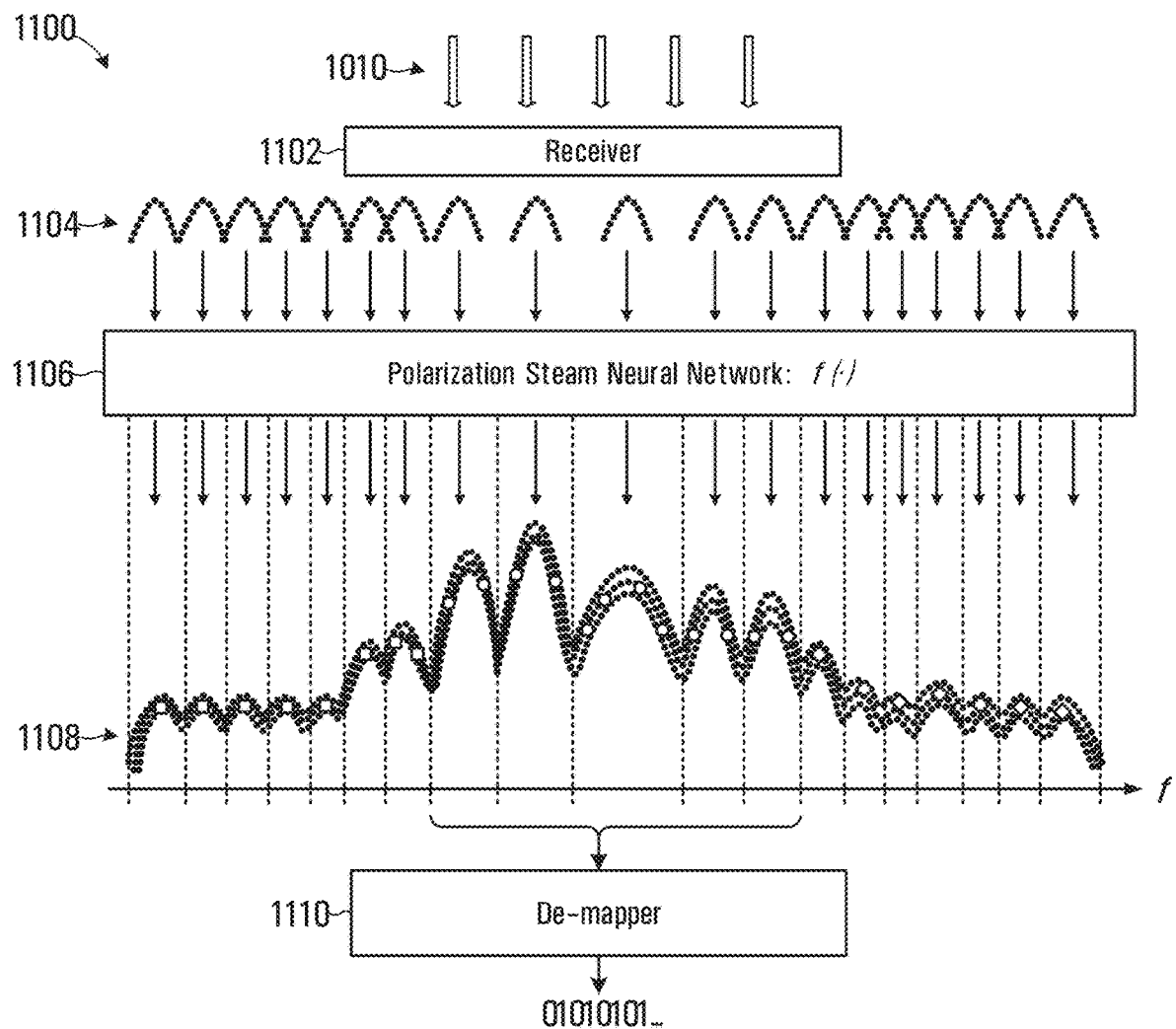
FIG. 11 is a block diagram of a process for receiving and demodulating the multiple-access transmission waveform transmitted in the process of FIG. 10.

Referring to FIG. 11, a process implemented by the receiver B of the plurality of receivers 204 for receiving and demodulating the multiple-access transmission waveform 1010 is illustrated schematically at 1100. Each one of plurality of receivers 204 receives the same multiple-access transmission waveform 1010 at a receiver block 1102 and must extract a portion of the waveform that includes the signal targeted to the receiver. As an example, the receiver B needs to extract specific symbols intended for receiver B, while discarding symbols intended for reception by the receivers A and C. The receiver block 1102 receives the waveform 1010 and produces a multi-dimensional Gaussian distribution 1104, which generally corresponds to the multi-dimensional Gaussian distribution of the source manifold 1004 produced by the polarization stream neural network 1002. During propagation of the waveform 1010 between the base station 202 and the receiver block 1102, noise, propagation losses, and/or multi-path propagation effects may cause some degradation. This may cause the received waveform to differ from the multi-dimensional Gaussian distribution of the source manifold 1004.

The multi-dimensional Gaussian distribution of the source manifold 1004 is then processed through a polarization stream neural network $f(\cdot)$ 1106. The polarization stream neural network 1106 may be configured using configuration information, including weights $w_i$ and biases $b_i$, which are transmitted to the receiver by the base station 202, as described in more detail below. The polarization stream neural network 1106 thus performs a transformation from the received multi-dimensional Gaussian distribution 1104 into symbols on the manifold 1108. The circle symbols "○" intended for receipt by the receiver B are processed by a de-mapper 1110, which extracts the signal. The square "□" and diamond symbols "◇" are discarded by the receiver B. The other receivers A and C in plurality of receivers 204 similarly process the waveform 1010 and extract their respective symbols.

Figure 12:
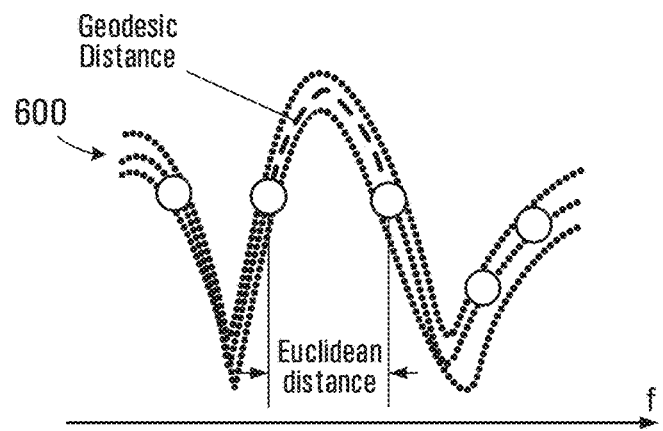
FIG. 12 is an enlarged view of a portion of the non-Gaussian manifold shown in FIG. 6.

For a linear modulation technique such as orthogonal frequency-division multiplexing (OFDM), both input and output are orthonormal manifolds over which the distance between constellation symbols is a Euclidean distance. An advantage of using the non-Gaussian source manifold 600 is that the effective distance between two constellation symbols is no longer based on Euclidean distance, but is rather based on geodesic distance. This is illustrated in FIG. 12, where Euclidian and geodesic distances between a pair of constellation symbols are indicated. The geodesic distance represents a shortest path between the two symbols along the surface of the source manifold 600. The geodesic distance thus represents a greater effective separation distance between constellation symbols for the non-Gaussian manifold than would be the case based on Euclidian distance for a linear manifold. The use of the non-Gaussian manifold provides for enhanced noise immunity between symbols and thus has the potential of reducing symbol confusion when demodulated at the receiver.

In one embodiment the training of the polarization stream neural network $f(\cdot)$ or $f^{-1}(\cdot)$ is performed either by the base station 202 or other network equipment. The neural networks $f(\cdot)$ or $f^{-1}(\cdot)$ may be defined by configuration information such as a set of weights $w_i$ and biases $b_i$ for the scaling and offset functions v(·) and u(·), the number and configuration of the polarization stages, and details of the implemented shuffle functions. The configuration information may be transmitted to the plurality of receivers 204 via an existing communications channel between the base station 202 and each of the receivers. The configuration information is used by each receiver A, B and C of the plurality of receivers 204 to configure their respective polarization stream neural networks 1106. Each receiver A, B and C of the plurality of receivers 204 will also need to receive constellation information identifying specific constellation points on dimensions of the manifold 1108 to facilitate extraction by the de-mapper 1110 of symbols intended for reception by the receiver. The manifold 1108 can output either Euclidean or geodesic distance to the de-mapper 1110, based on a de-mapping algorithm implemented by the de-mapper.

In some embodiments, the training of the polarization stream neural network $f(\cdot)$ or $f^{-1}(\cdot)$ may be performed by one of the receivers 204. The receiver would then transmit the configuration information to the base station 202 for configuring transmissions to the plurality of receivers 204, using control channels or data channels.

Figure 13:
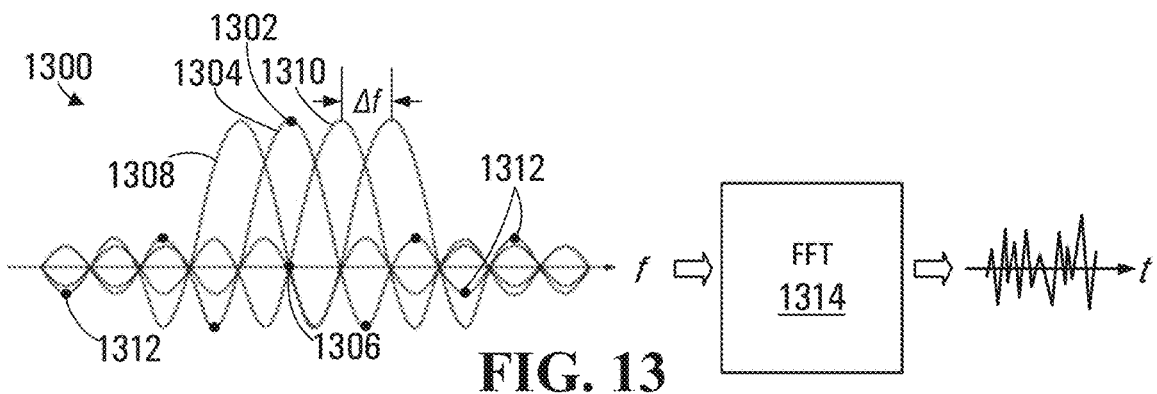
FIG. 13 is a schematic representation of an orthogonal frequency-division multiple access linear modulation.

Multiple-access transmissions in which the waveform 1010 is modulated using a non-linear polarization stream neural network have several advantages over multiple-access transmissions generated using linear modulators. As an example of a linear modulation, an OFDMA source manifold 1300 is shown in FIG. 13 and includes a plurality of sinc(·) functions in the frequency domain. The zero points of each sinc(·) function overlap poles of other sinc(·) functions. For example, the pole 1302 associated with a sinc(·) function 1304 overlaps a zero 1306 associated with sinc(·) functions 1308 and 1310. The overlapping of the poles and zeros allows adjacent sinc(·) functions or sub-carriers to be closely juxtaposed in the OFDMA source manifold 1300 and thus the sub-carrier spacing $\Delta f$ is less than for conventional FDMA.

However, in an OFDMA transmission, all the sub-carriers must share the same sinc(·) profile and it is not possible to only adjust some sub-carriers based on differences in channel conditions for some receivers. OFDMA transmissions are thus limited in their ability to compensate for channel conditions. The non-Gaussian source manifold 600 shown in FIG. 6 has the advantage of facilitating shaping of the manifold to include different portions 604, 606, and 608 for different receivers. Additionally, for the OFDMA transmission shown in FIG. 13, a transmission power $P_{TX}$ is equally shared by the sub-carriers. As much as 50% of $P_{TX}$ may be wasted in secondary poles associated with each sinc(·) function (some of the secondary poles 1312 are shown in FIG. 13 for the sinc(·) functions 1304 in FIG. 13).

The OFDMA source manifold 1300, when transformed into a time domain manifold by an FFT (Fast Fourier Transformation) manifold transformer 1314, results in a time domain manifold having relatively high peak-to-average power ratio (PAPR). Higher PAPR for a modulation scheme is associated with poor power efficiency. Higher PAPR may also be associated with possible signal degradation, if the transmitter power amplifier is driven into a non-linear region. Non-linear amplification may lead to in-band distortion, increased Bit Error Rate (BER), and adjacent channel interference and other negative impacts. Attempts to filter the time domain signal generally result in some of the outlying sub-carriers on the OFDMA source manifold 1300 being distorted and unusable. For example, in OFDMA having 1024 complex carriers (i.e. 2048 carriers in total) it is not unusual to disable 900 or more of the sub-carriers, thus significantly reducing spectral efficiency.

The non-Gaussian source manifold 600 used in the process 1000 may however be shaped and selected to reduce the PAPR without incurring any significant loss in spectral efficiency. For example, the Gaussian source manifold 600 may be shaped to effectively reduce energy wastage on secondary poles.

One of the advantages of using a polarization stream architecture to generate the multiple access waveform is that the waveform may be generated based on an actual signal transmission environment. In practice, different systems may be differently optimized. For example, in some embodiments, the polarization stream network may be optimized to generate a waveform that avoids highly attenuated sub-carriers. In other embodiments, the polarization stream network may be optimized to generate a waveform that tolerates greater Doppler frequency offsets with larger sub-carrier spacing. For a multiple-access waveform, the polarization stream network may be optimized for multiple receivers that have different optimization targets. In general, Gaussian manifolds have a low PAPR, due to maximum entropy theory, and in practice a Gaussian signal has a at least a probability of resulting in a high PAPR. The polarization stream network may thus be used to control the possible variance in PAPR when configuring a waveform for transmission using a Gaussian manifold.

As disclosed above, configuration information may be transmitted to the plurality of receivers 204 via an existing communications channel between the base station 202 and each of the receivers and used by each receiver to configure their respective demodulators. The configuration information would include the shuffle functions shuffle(1) to shuffle (n+1), that would permit the receivers 204 to each configure the corresponding polarization stream networks 800 or 820 at the respective receivers. In one embodiment, the shuffle functions may be shared with the plurality of receivers 204 on a secure basis. In this embodiment, the multiple-access transmission waveform 1010 could only be demodulated by a receiver that has the necessary configuration information to implement the shuffle functions.

In the modulation and transmission process 1000 shown in FIG. 10 and the receive process 1100 shown in FIG. 11, the source manifold 600 and target manifold 702 have the same number of signal dimensions. This has the advantage of making the polarization stream neural network 700 easily invertible to configure the reverse polarization stream network 820 once the forward polarization stream network 800 has been configured. One difficulty in employing other types of non-linear transformers is that it is usually computationally difficult and/or computationally inefficient to invert a non-linear transformer. As disclosed above in connection with the polarization stream networks shown in FIG. 8, after the forward network 800 has been trained, the reverse network 820 may be easily obtained by exchanging the multiplication and division operators, the addition and subtraction operators, and reversing the input and output. The ability to generate the reverse polarization stream network 820 through a simple reconfiguration of the forward polarization stream network 800 avoids further computational steps. However, in order to make this simple inversion feasible the inputs X and outputs Y of the forward polarization stream network 800 should have the same number of signal dimensions.

Figure 14A:
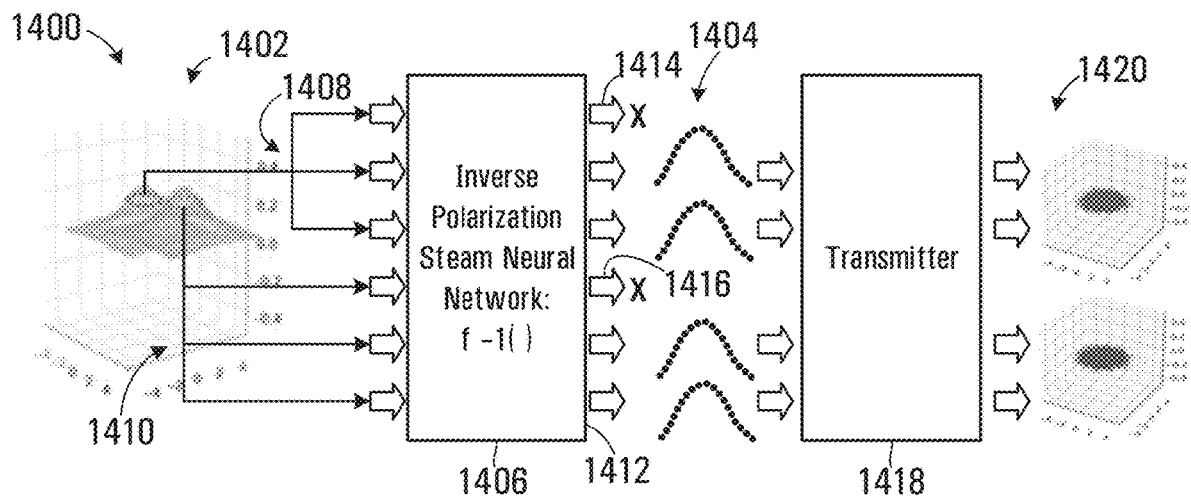
FIG. 14A is a block diagram of a process for modulating and transmitting a dimension-reduced multiple-access waveform.

In other modulation schemes, information to be transmitted may be compressed from a higher dimensional signal space to lower dimensional space. An example of such a modulation scheme is Sparse Code Multiple Access (SCMA) transmission, in which coded non-orthogonal transmissions of multiple signals are used to improve spectral efficiency for a transmission. Referring to FIG. 14A, an example of a modulation and transmission process for a dimension-reduced transmission is shown generally at 1400. In this example, a source manifold 1402 of six signal dimensions is transformed into a target manifold 1404 having four dimensions. The transformation is performed using an inverse polarization stream network $f^{-1}(\cdot)$ 1406, configured generally as shown in FIG. 8 at 820. The polarization stream network 1406 must therefore be configured to transform between an N-dimensional source manifold and M-dimensional target manifold, where the dimension N exceeds the dimension M.

In the embodiment shown, the inverse polarization stream network 1406 receives three input signal dimensions 1408. The three input signal dimensions 1408 are based on a first circular constellation on the source manifold 1402 that maps information intended to be received by a first receiver. The inverse polarization stream network 1406 also receives three input signal dimensions 1410. The three input signal dimensions 1410 are based on a second circular constellation on the source manifold 1402 that maps information intended to be received by a second receiver.

The inverse polarization stream network 1406 processes the six input signal dimensions 1408 and 1410 and generates two sets of three signal dimensions 1414 and 1416 at an output 1412 of the inverse polarization stream network 1406. However, one of the signal dimensions in each of the sets of three signal dimensions 1414 and 1416 is collapsed to a zero value (or some other constant value). A transmitter 1418 then generates a multiple-access transmission waveform 1420 based on the remaining four signal dimensions of the target manifold 1404 that have not been collapsed by the inverse polarization stream network 1406. In one embodiment, the inverse polarization stream network 1406 may be configured using neural network portions, as described above.

Figure 14B:
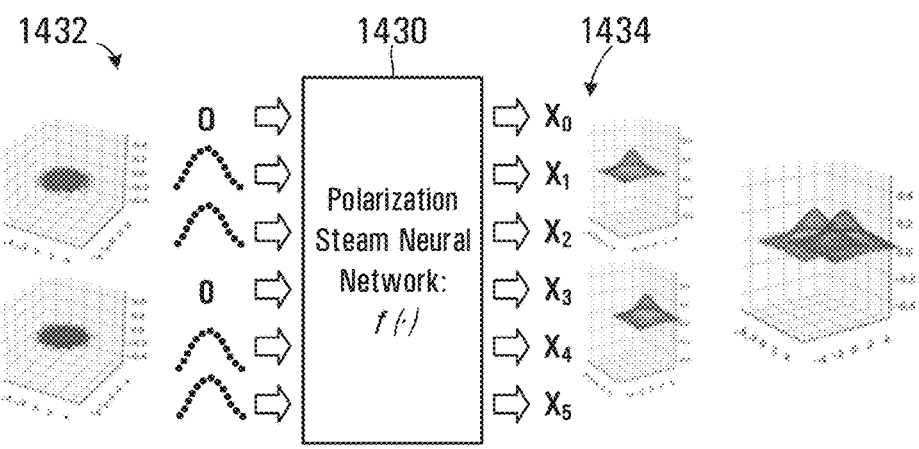
FIG. 14B a schematic view illustrating a training process for training a polarization stream neural network to implement the process of FIG. 14A.

Referring to FIG. 14B, a forward polarization stream neural network 1430 may be trained using a pair of Gaussian distributions 1432, in which the first and third dimensions are collapsed to zero. The forward polarization stream neural network 1430 may be implemented generally as shown at 800 in FIG. 8. A target manifold 1434 (x0, x1, x2, x3, x4, x5) simulates a logistic function represented by cloud of samples:

$$Z = \frac{\exp\left(\frac{\sqrt{(x-\mu)^2 + (y-\mu)^2}}{\sigma}\right)}{\sigma * \left(1 + \exp\left(\frac{\sqrt{(x-\mu)^2 + (y-\mu)^2}}{\sigma}\right)\right)^2},$$ Eqn 4 where:
x0, x1, x2=x, y, z respectively with μ=0 and −4≤x, y≤4, and
x3, x4, x5=x, y, z respectively with μ=2 and −2≤x, y≤6.

The forward polarization stream neural network 1430 will thus be trained based on the pair of Gaussian distributions 1432 with the first and third dimensions collapsed to zero. The forward polarization stream neural network 1430 remains invertible due to the input and output having the same number of signal dimensions. Accordingly, once the forward polarization stream neural network 1430 has been trained, the inverse polarization stream network $f^{-1}(\cdot)$ (1406) is readily configured for use in the dimension-reduced transmission shown generally at 1400 in FIG. 14A.

Figure 14C:
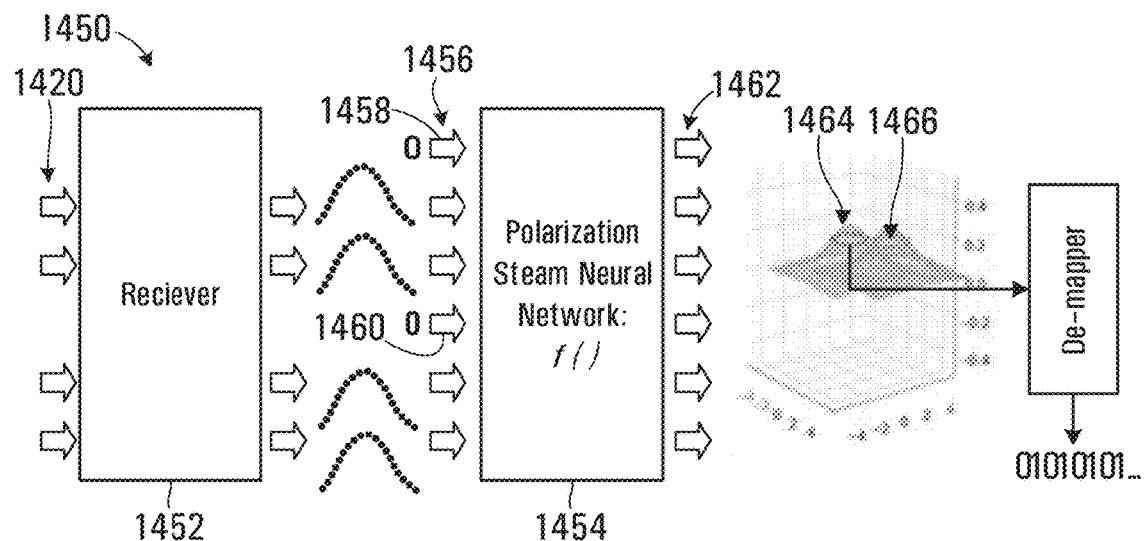
FIG. 14C is a block diagram of a process for receiving and demodulating the dimension-reduced multiple-access transmission waveform transmitted in the process of FIG. 14A

Referring to FIG. 14C, an example of a process for reception and demodulation of a dimension-reduced transmission is shown generally at 1450. The multiple-access transmission waveform 1420 having four signal dimensions is received by a receiver 1452 and provided to a forward polarization stream neural network $f(\cdot)$ 1454, such as shown at 800 in FIG. 8. The receiver 1452 also receives configuration information defining the neural network $f(\cdot)$, such as a set of weights $w_i$ for the scaling and offset functions $v(\cdot)$ and $u(\cdot)$, the number and configuration of the polarization stages, and details of the implemented shuffle functions. In this embodiment the configuration information further includes an identification of which of the signal dimensions are to be collapsed at an input 1456 of the forward polarization stream neural network 1454. In this embodiment, the first and third dimensions 1458 and 1460 are collapsed to zero to correspond to the training conditions shown in FIG. 14B. The forward polarization stream neural network 1454 transforms the input signals and collapsed dimensions to recreate the original six signal dimensions 1462 corresponding to the source manifold 1402, which provide output constellations 1464 and 1466. In this embodiment, information intended for receipt by the first receiver is carried on the output constellation 1464. For receipt of the multiple-access transmission waveform 1420 by the first receiver, a de-mapper 1468 extracts the signal intended for receipt by this receiver from the output constellation 1464. The information intended for receipt by the second receiver that is carried on the output constellation 1466 is discarded by the first receiver.

The dimension-reduced transmission 1400 has the advantage of increasing spectral efficiency by reducing the number of signal dimensions transmitted over the channel. However, because the reduction in signal dimension causes loss in performance for the transmission, it may be necessary to take this loss into account in configuring transmissions. For example, aspects such as constellation design, codebook design, or power control may be specifically selected to ensure that adjacent constellation points are as distant as possible over the source manifold 1402. Additionally, or alternatively, advanced non-linear receiving algorithms such as message passing algorithm, successive cancellation, and/or interference cancellation may be implemented at the receiver to improve reception reliability.

In some embodiments a transmission from the base station 202 may extend a signal dimension such that a modulated transmission waveform has a greater number of signal dimensions than the source manifold. As an example, Code-division multiple access (CDMA) modulation extends the signal dimension by using a spreading code C to spread each information bit over F bits, where F is known as the spreading factor. Data intended for multiple receivers may be encoded using different spreading codes $C_A$, $C_B$, etc. The spreading codes may be carefully selected to be mutually orthogonal to each other using an orthogonal variable spreading factor (OVSF).

Figure 15:
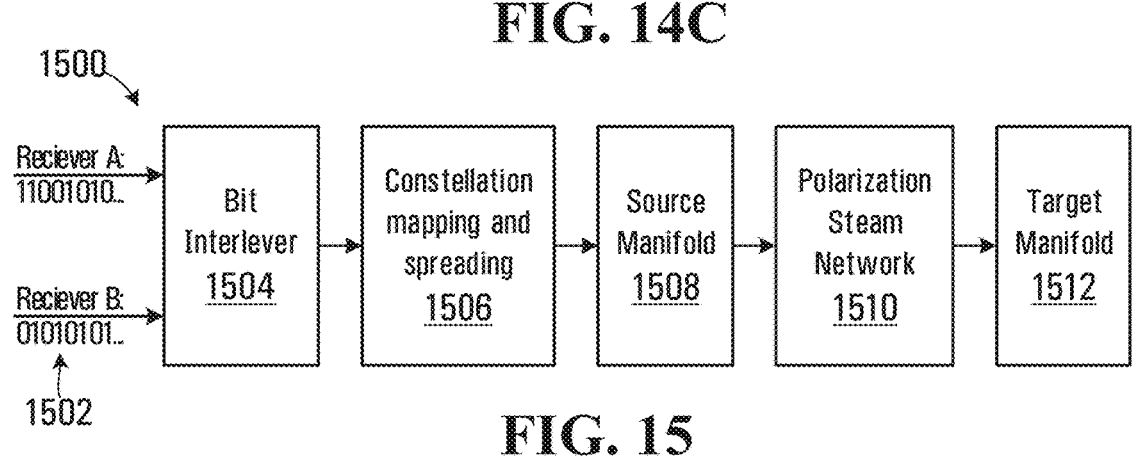
FIG. 15 is a block diagram of a modulator implemented at the base station shown in FIG. 2 for performing a dimension-extended modulation.

Referring to FIG. 15, a block diagram of a modulator implemented at the base station 202 for performing a dimension-extended modulation is shown generally at 1500. The modulator 1500 is described in the context of transmitting signals 1502 targeted for transmission to each of a pair of receivers A and B. The modulator 1500 includes a bit interleaver 1504 that multiplexes the signals 1502 from the receivers A and B into one or more bit streams. The bit interleaver 1504 may implement an interleaving scheme such as block interleaving, convolutional interleaving, matrix interleaving, random interleaving, or any other scheme for combining streams of data bits. The one or more interleaved bit streams produced by the bit interleaver 1504 are then processed by a constellation mapping and spreading block 1506. The constellation mapping and spreading block 1506 maps the bit streams onto a non-Gaussian source manifold 1508. The constellation mapping and spreading block 1506 also implements a spreading function C that spreads the constellation points on the source manifold 1508 using a spreading factor F. The spreading function F increases the signal dimension from N to a signal dimension M on the source manifold 1508, where M=N×F.

The modulator 1500 includes a polarization stream network 1510 that performs a transformation of the non-Gaussian source manifold 1508 into a target manifold 1512. The target manifold 1512 may be a Gaussian manifold and is used as the basis for generation of a multiple-access transmission waveform 1514 by a transmitter of the base station 202.

Figure 16A:
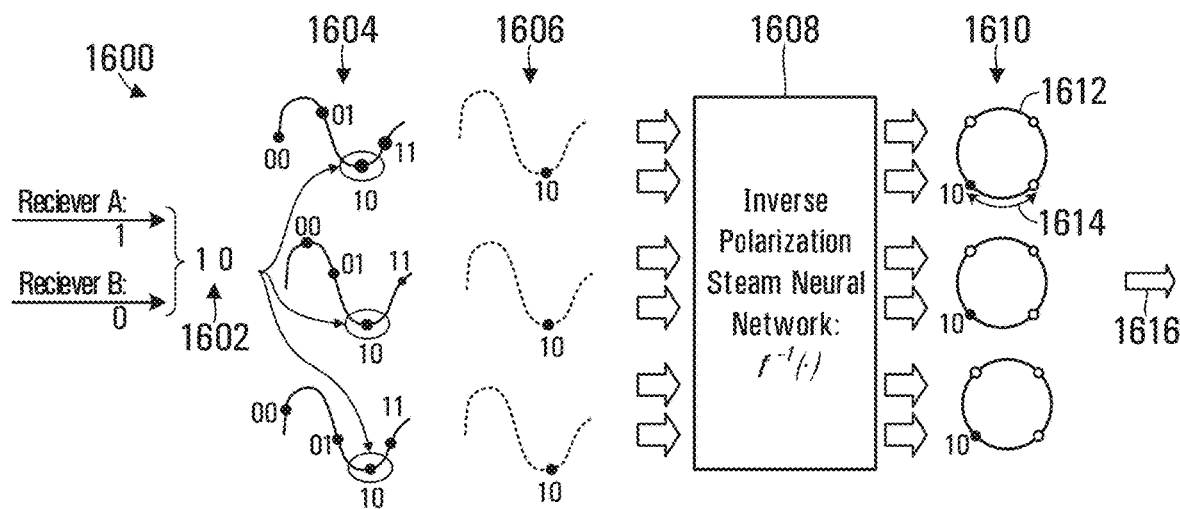
FIG. 16A is a block diagram of a process for modulating and transmitting a dimension-extended multiple-access waveform.

Referring to FIG. 16A, an example of a transmission process is shown in FIG. 16 at 1600. Signal bits intended for transmission to one of the receivers A and B are interleaved into a bit stream 1602 and mapped onto each of three constellations 1604 as shown by the arrows. In this embodiment, the bit stream 1602 includes a single bit for each of the users A and B, and the spreading factor is F=6 for each device. The constellations 1604 spread the signals for the receivers A and B over a non-Gaussian source manifold 1606, which has 6 signal dimensions. The source manifold 1606 is transformed by an inverse polarization stream neural network $f^{-1}(\cdot)$ 1608 to produce a target Gaussian manifold 1610. The target Gaussian manifold 1610 also has 6 signal dimensions and may be used as a basis for generating a multiple-access transmission waveform 1616. Because the source manifold 1606 and target manifold 1610 have the same number of signal dimensions, the polarization stream neural network 1608 is easily invertible as described above. The transmission process 1600 thus implements a dimension-extended transmission by transforming the bit stream 1602 including 2 bits into a target manifold having 6 dimensions. The circle 1612 of the target Gaussian manifold 1610 generally represents a capacity associated with the manifold and the arrow 1614 indicates the distance between adjacent constellation points on the manifold.

Figure 16B:
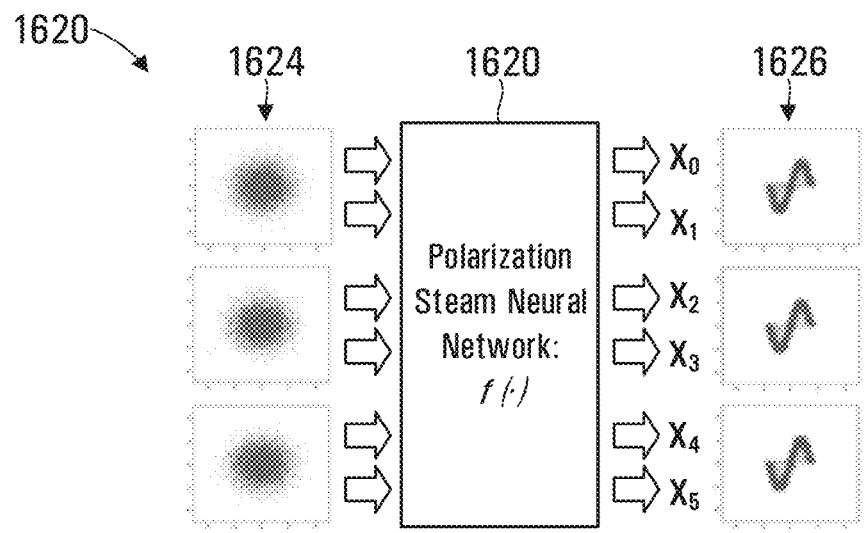
FIG. 16B is a schematic view illustrating a training process for training a polarization stream neural network to implement the process of FIG. 16A.

Referring to FIG. 16B, a simplified training example 1620 involves training a forward polarization stream neural network 1622 to transform a Gaussian distribution 1624 into a sine wave manifold 1626, where:

$$x_1 = 2\sin(2x_0),\qquad\text{Eqn 5}$$

and:

$$-\frac{\pi}{2} \le x_0 \le \frac{\pi}{2}$$ and

[x1, x0] is repeated for [x3, x2] and [x5, x4].

Although the target manifold 1626 in the training example is selected as a sine-wave manifold for purposes of this description, a suitable non-Gaussian manifold may be selected based on channel conditions between the base station 202 and the plurality of receivers 204. Because the polarization stream neural network 1620 has the same input and output dimensions, the forward network $f(\cdot)$ may be inverted to generate the reverse network $f^{-1}(\cdot)$. The reverse network $f^{-1}(\cdot)$ may be used as the reverse polarization stream neural network 1608 in FIG. 16A. The training may be performed at the base station 202 or other network equipment associated with the communications network. Configuration information defining the neural networks $f(\cdot)$ or $f^{-1}(\cdot)$ may be transmitted to the plurality receivers A and B via an existing communications channel between the base station 202 and each of the receivers. Additionally, in this embodiment the spreading code C, constellation mapping information, and bit interleaving scheme information would also be transmitted to each receiver A and B.

Figure 16C:
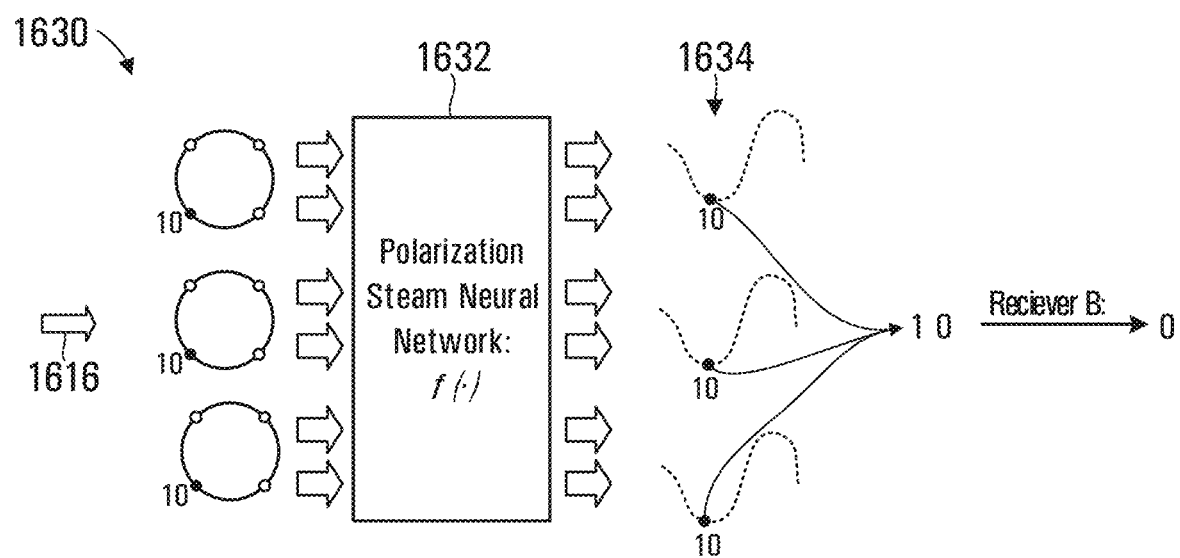
FIG. 16C is a block diagram of a process for receiving and demodulating the dimension-extended multiple-access transmission waveform transmitted in the process of FIG. 16A.

Referring to FIG. 16C, an example of a reception and demodulation process implemented on the receiver B for receiving the multiple-access transmission waveform 1616 is shown at 1630. The multiple-access transmission waveform 1616 is received and demodulated by a forward polarization stream neural network $f(\cdot)$ 1632 to recreate the manifold 1606 at the receiver as a received manifold 1634. The receiver B is then able to de-map the constellation point by performing an autocorrelation based on the spreading code C, to recover the stream 1 0. The received bit interleaving configuration information may then be used to extract the bit 0 intended for receipt by the receiver B. The bit 1 intended for receipt by the receiver A is discarded at the receiver B.

In some embodiments the shuffling functions for the polarization stream neural networks 1608 and 1632 may be shared on a secure basis between base station and receivers A and B. Receivers other than the receivers A and B would not be able to demodulate the multiple-access transmission waveform 1616, thus providing an additional layer of security for the transmission. Similarly, sharing the spreading code C on a secure basis would add a further level of security, because receivers not included in the multiple access transmission would also not be able to de-map constellation points on the received manifold 1634.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A method for multiple-access wireless transmission, the method comprising:
   mapping a plurality of signals onto a multi-dimensional non-Gaussian source manifold, the plurality of signals including signals targeted for transmission to a plurality of receivers;
   transforming the source manifold into a multi-dimensional target manifold using a polarization stream network, the polarization stream network including a plurality of transformations for shaping between the non-Gaussian source manifold and the multi-dimensional target manifold that are configured in a training exercise; and
   generating a multiple-access transmission waveform for transmission to the plurality of receivers, the multiple-access transmission waveform being based on the target manifold.

2. The method of claim 1 wherein the target manifold comprises a multi-dimensional Gaussian manifold.

3. The method of claim 1 further comprising transmitting configuration information defining the polarization stream network to the plurality of receivers.

4. The method of claim 1 further comprising selecting the source manifold from a plurality of source manifolds in response to a channel condition determined for the transmission.

5. The method of claim 4 wherein some regions of the source manifold are associated with increased signal attenuation and wherein mapping the plurality of signals comprises mapping the plurality of signals onto regions of the source manifold not associated with increased signal attenuation.

6. The method of claim 1 wherein the source manifold comprises an N-dimensional manifold and wherein transforming the signals comprises transforming the signals into an M-dimensional target manifold.

7. The method of claim 6 wherein the dimension N associated with the source manifold is equal to the dimension M associated with the target manifold.

8. The method of claim 6 wherein the multiple-access transmission waveform comprises an orthogonal frequency-division multiple access (OFDMA) transmission waveform including M sub-carriers.

9. The method of claim 6 wherein the polarization stream network is configured for transforming between an N-dimensional source manifold and M-dimensional target manifold, and wherein the dimension N of the source manifold exceeds the dimension M of the target manifold, and wherein excess dimensions of the target manifold are held constant when transforming signals from the source manifold to the target manifold.

10. The method of claim 9 further comprising transmitting information to the plurality of receivers identifying the excess dimensions on the target manifold that are held constant.

11. The method of claim 9 wherein the multiple-access transmission waveform comprises a sparse code multiple access (SCMA) transmission waveform.

12. The method of claim 6 wherein the polarization stream network is configured for transforming between an N-dimensional source manifold and M-dimensional target manifold and wherein the dimension M associated with the target manifold exceeds the dimension N associated with the source manifold by at least one excess dimension.

13. The method of claim 12 further comprising transmitting information to the plurality of receivers identifying the at least one excess dimension.

14. The method of claim 12 wherein the multiple-access transmission waveform comprises a code-division multiple access (CDMA) transmission waveform and wherein the at least one excess dimension comprises a spreading code.

15. The method of claim 6 wherein the polarization stream network comprises at least one neural network and wherein the method further comprises training the neural network to determine a set of weights for the at least one neural network that are operable to configure the polarization stream network to perform the transformation between the source manifold and the target manifold.

16. The method of claim 15 wherein training the at least one neural network comprises training the neural network to transform from the target manifold to the source manifold to determine the set of weights for the at least one neural network, the polarization stream network being reversible to provide parameters for a reversed polarization stream network operable to transform from the source manifold to the target manifold.

17. The method of claim 15 wherein training the at least one neural network comprises causing the transmitter to train the at least one neural network and further comprising transmitting information to the plurality of receivers defining a configuration of the polarization stream network and the set of weights for the least one neural network.

18. The method of claim 15 wherein training the neural network comprises causing one of the plurality of receivers to train the neural network and further comprising transmitting information to the plurality of receivers defining a configuration of the polarization stream network and the set of weights for the least one neural network.

19. The method of claim 1 wherein the polarization stream network comprises a cascade of one or more polarization stages, each polarization stage including at least a shuffle function that shuffles signal data in accordance with a shuffle order, and further comprising transmitting information identifying the shuffle order to the plurality of receivers.

20. The method of claim 1 further comprising receiving the multiple-access transmission waveform at one of the plurality of receivers and using the polarization stream network to transform the multiple-access transmission waveform from the target manifold to the source manifold to facilitate recovery of signals targeted for transmission to the one of the plurality of receivers.

21. An apparatus for multiple-access wireless transmission, the apparatus comprising a transmitter operably configured to:
map a plurality of signals onto a multi-dimensional non-Gaussian source manifold, the plurality of signals including signals targeted for transmission to a plurality of receivers;
transform the source manifold into a multi-dimensional target manifold using a polarization stream network, the polarization stream network including a plurality of transformations for shaping between the non-Gaussian source manifold and the multi-dimensional target manifold that are configured in a training exercise; and
generate a multiple-access transmission waveform for transmission to the plurality of receivers, the multiple-access transmission waveform being based on the target manifold.

\* \* \* \* \*